US012675961B2

(12) United States Patent
Barsotti et al.

(10) Patent No.: US 12,675,961 B2
(45) Date of Patent: Jul. 7, 2026

(54) CONTEXT-BASED AVATAR QUALITY

(71) Applicant: Apple Inc., Cupertino, CA (US)

(72) Inventors: Hayden James Barsotti, Mountain View, CA (US); Connor A. Smith, San Jose, CA (US); Alexandre Da Veiga, San Francisco, CA (US); Leanid Vouk, San Carlos, CA (US); Sebastian P. Herscher, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 89 days.

(21) Appl. No.: 18/212,247

(22) Filed: Jun. 21, 2023

(65) Prior Publication Data

US 2024/0005622 A1     Jan. 4, 2024

Related U.S. Application Data

(60) Provisional application No. 63/408,890, filed on Sep. 22, 2022, provisional application No. 63/356,781, filed on Jun. 29, 2022.

(51) Int. Cl.
G06T 15/00          (2011.01)
G06F 3/01           (2006.01)
          (Continued)

(52) U.S. Cl.
CPC .............. G06T 19/20 (2013.01); G06F 3/013 (2013.01); G06T 13/40 (2013.01); G06T 15/005 (2013.01)

(58) Field of Classification Search
CPC ....... G06T 19/00; G06T 15/005; G06T 17/20; G06T 17/00; G06T 15/10; G06T 15/00;
          (Continued)

(56) References Cited

U.S. PATENT DOCUMENTS

| | | | |
|---|---|---|---|
| 11,228,622 B2 | 1/2022 | Copley et al. | |
| 2010/0070858 A1* | 3/2010 | Morris | ................... H04N 5/445 |
| | | | 725/39 |

(Continued)

FOREIGN PATENT DOCUMENTS

| | | |
|---|---|---|
| WO | WO 2021257868 | 12/2021 |
| WO | WO 2022066642 | 3/2022 |

OTHER PUBLICATIONS

Horwitz, Jeremy; "Tobii Spotlight's foveated rendering can cut VR graphics load by 57%"; Jul. 30, 2019; pp. 1-4.

(Continued)

*Primary Examiner* — Gordon G Liu
(74) *Attorney, Agent, or Firm* — Thompson Hine LLP

(57)          ABSTRACT

Various implementations disclosed herein include devices, systems, and methods that provide a communication session in which a first device receives and uses streamed avatar data to render views that include a time-varying avatar, e.g., video content of some or all of another user sent from the other user's device during the communication session. In order to efficiently use resources (e.g., power, bandwidth, etc.), some implementations adapt the avatar provision process (e.g., video framerate, image resolution, etc.) based on user context, e.g., whether the viewer is looking at the avatar, whether the avatar is within the viewer's foveal region, or whether the avatar is within the viewer's field of view.

25 Claims, 15 Drawing Sheets

(51) Int. Cl.
*G06T 13/40* (2011.01)
*G06T 19/20* (2011.01)

(58) Field of Classification Search
CPC ......... G06T 13/40; G06T 15/06; G06T 15/08;
G06T 15/20; G06T 15/04; G06T 2210/41;
G06T 1/20; G06T 19/006; G06T 7/337;
G06T 7/50; G06T 7/74; G06T 19/20;
G06T 2200/04; G06T 2207/10016; G06T
2207/30244; G06T 2219/024; G06T
2219/2016; G06T 2210/12; G06T
2210/21; G06T 7/70; G06T 2207/20084;
H04N 23/57; H04N 23/90; H04N 23/64;
H04N 23/611; H04N 23/635; H04N
7/147; H04N 7/157; G06F 16/51; G06F
21/602; G06F 3/013; G06F 3/012; G06F
3/011; G06V 20/20
USPC .......................................................... 345/419
See application file for complete search history.

(56) References Cited

U.S. PATENT DOCUMENTS

2012/0312684 A1   12/2012   Wang et al.
2014/0035901 A1*  2/2014   Chen ....................... G06T 13/40
                                                              345/419
2018/0005429 A1*  1/2018   Osman .................... A63F 13/56
2019/0333261 A1*  10/2019  Nakashima ............. G06F 3/011

OTHER PUBLICATIONS

Luebke, David, Hallen, Benjamin, Newfield, Dale and Watson, Benjamin; "Perceptually Drive Simplification Using Gaze-Directed Rendering"; University of Virginia Technical Report CS-2000-04; pp. 1-9.

Sundstedt, Veronica, Bernhard, Matthias, Stavrakis, Efstathios, Reinhard, Erik and Wimmer, Michael: "Chapter 25—Visual Attention and Gaze Behavior in Games: An Object-Based Approach"; pp. 1-41: 2013.

Murphy, Hunter; Duchowski; Andrew T .; "Gaze-Contingent Level of Detail Rendering"; Eurographics2001/Jonathan C. Roberts; pp. 1-10.

Zha, Hongbin, Makimoto, Yoshinobu; Hasegawa, Tsutomu; "Dynamic Gaze-Controlled Levels of Detail of Polygonal Objects in 3-D Environment Modeling"; May 5, 2021; pp. 1-10.

Lindeberg, Tim; "Concealing rendering simplifications using gaze contingent depth of field" ; Jun. 2016; Master's Thesis at CSC: pp. 1-65.

* cited by examiner

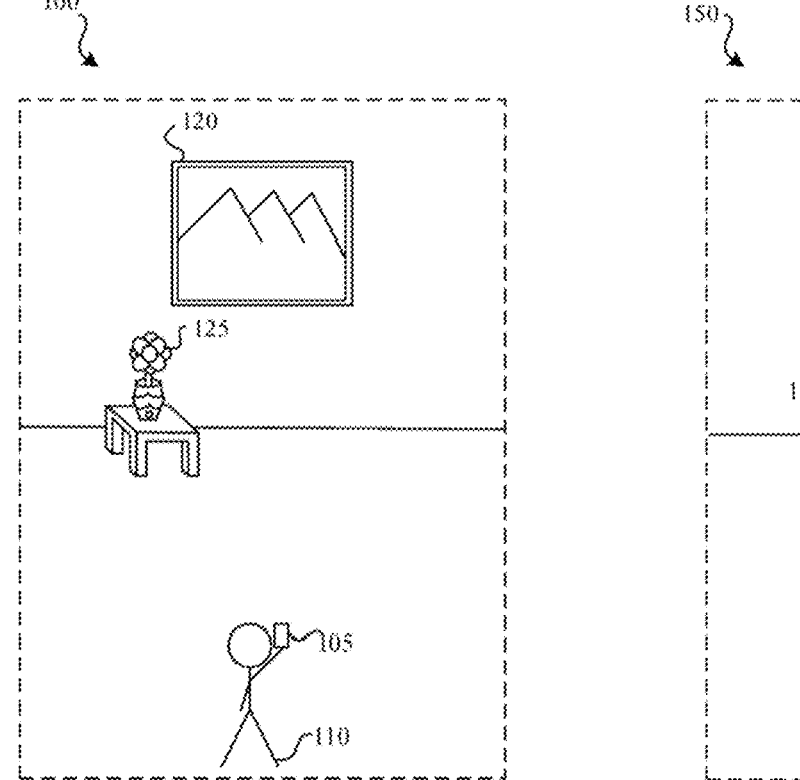
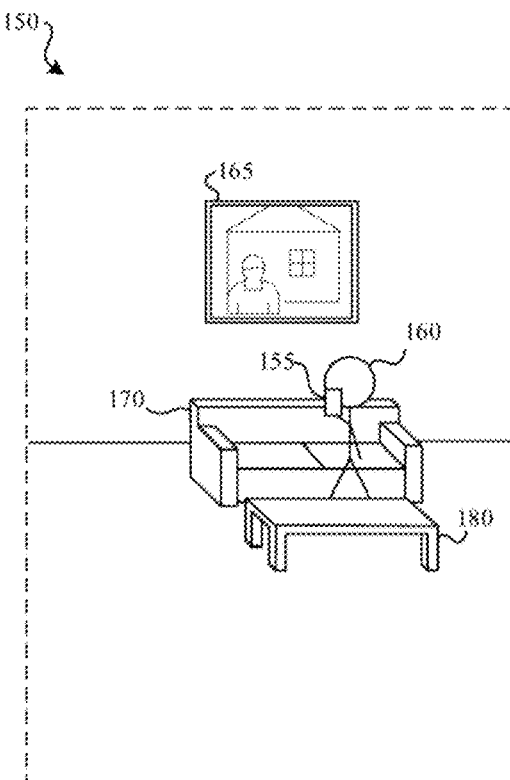
FIG. 1

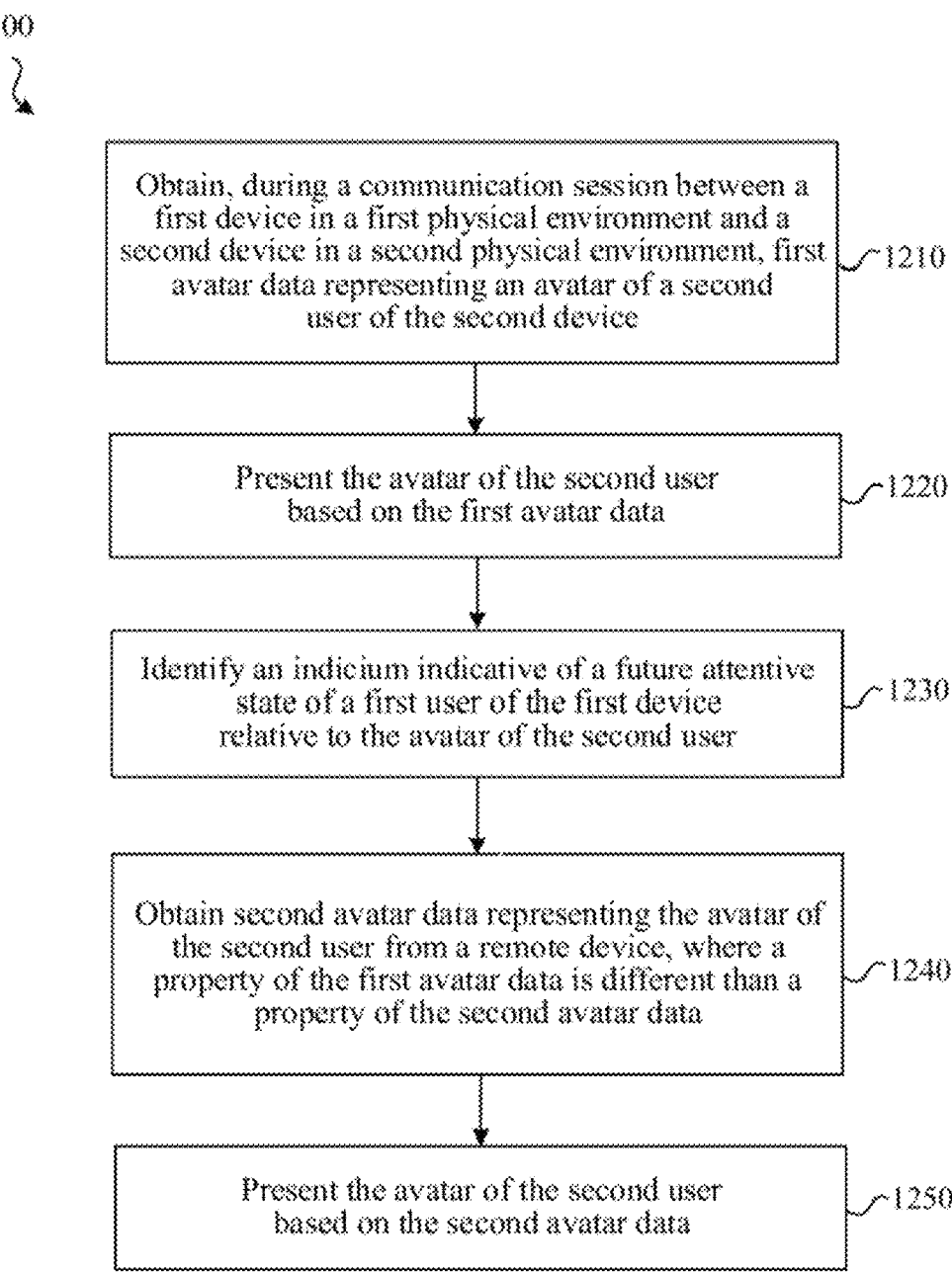

1200

Obtain, during a communication session between a first device in a first physical environment and a second device in a second physical environment, first avatar data representing an avatar of a second user of the second device ~1210

Present the avatar of the second user based on the first avatar data ~1220

Identify an indicium indicative of a future attentive state of a first user of the first device relative to the avatar of the second user ~1230

Obtain second avatar data representing the avatar of the second user from a remote device, where a property of the first avatar data is different than a property of the second avatar data ~1240

Present the avatar of the second user based on the second avatar data ~1250

CONTEXT-BASED AVATAR QUALITY

CROSS-REFERENCE TO RELATED APPLICATIONS

This application claims the benefit of U.S. Provisional Application Ser. No. 63/356,781 filed Jun. 29, 2022, and U.S. Provisional Application Ser. No. 63/408,890 filed Sep. 22, 2022, each of which is incorporated by reference herein in its entirety.

TECHNICAL FIELD

The present disclosure generally relates to avatars used to represent users of electronic devices during multi-user communication sessions.

BACKGROUND

Various techniques are used to enable people to share audio, images, and other content during communication sessions. However, existing systems may not provide communication sessions having various desirable attributes, such as avatars accurately representing aspects of user appearance or avatars that are shared via processes that utilize system resources efficiently given resource constraints.

SUMMARY

Various implementations disclosed herein include devices, systems, and methods that provide a communication session in which a first device receives and uses avatar data to render views that include a time-varying avatar, e.g., video-like content of some or all of another user sent from the other user's device during the communication session. In order to efficiently use resources (e.g., power, bandwidth, etc.), some implementations adapt the avatar provision process (e.g., video framerate, image resolution, etc.) based on user context, e.g., whether the viewer is looking at the avatar, whether the avatar is within the viewer's foveal region, whether the avatar is within the viewer's field of view, or whether the user's eye vergence is focused on the avatar.

In some implementations a processor performs a method by executing instructions stored on a computer readable medium. The method may be performed at a first device, such as at a viewer's device, having a processor. The method obtains, during a communication session between the first device in a first physical environment and a second device (e.g., a sender's device) in a second physical environment, first avatar data representing an avatar of a second user of the second device. The method presents the avatar of the second user based on the first avatar data. In some implementations, this involves presenting a view of a 3D environment, such as an extended reality (XR) environment, that includes a 3D avatar positioned within it.

The method identifies an indicium indicative of a future attentive state of a first user of the first device relative to the avatar of the second user. Examples of an indicium indicative of attentive states include, but are not limited to, whether a first user is looking at the second user's avatar, whether the second user's avatar is within the first user's foveal region or field of view, whether the second user's avatar is close or far away from the first user's viewpoint, what the first user is doing (e.g., being still, moving, walking, moving his head, etc.), what the second user represented by the avatar is doing (e.g., talking, starting to move hands, etc.), what the users together are doing or attentive to (e.g., watching TV together, walking side by side, looking at a white board), and the environmental conditions (e.g., lighting, air quality).

The method, in accordance with identifying the indicium of the future attentive state, obtains second avatar data and presents the avatar of the second user based on the second avatar data. Obtaining the second avatar data may involve obtaining the second avatar data representing the avatar of the second user from a remote device (e.g., the second device or an intermediate server), where a property (e.g., a quality level or frame rate) of the first avatar data is different than a property of the second avatar data.

Various implementations disclosed herein include devices, systems, and methods that provide a communication session in which a first device receives and uses avatar data to render views that include a time-varying avatar, e.g., video-like content of some or all of another user sent from the other user's device during the communication session. In some implementations, the avatar provision process is adapted (e.g., framerate/quality) based on user context using segmented avatar data. Avatar data may be segmented into different portions (e.g., macro blocks) that each have data in multiple quality levels and the receiving device may select data of an appropriate quality level for each avatar portion or select an appropriate rendering optimization for an avatar portion based on whether the attentive state of the user will be on that portion, e.g., hands may be displayed in high quality and the head in low quality when the user is looking at the hands. Example rendering optimizations that may be used include, but are not limited to, mesh resolution selection, animation resolution selection, and shader detail/complexity selection.

In some implementations a processor performs a method by executing instructions stored on a computer readable medium. The method may involve a first device identifying an indicium indicative of a future attentive state of a first user of the first device relative to an avatar of a second user during a communication session between the first device in a first physical environment and the second device in a second physical environment. The method may determine that the future attentive state of the first user corresponds to a first portion of the avatar and, in accordance with determining that the future attentive state of the first user corresponds to the first portion of the avatar, present the avatar of the second user, wherein the first portion of the avatar is presented with a higher quality than a second portion of the avatar.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 1 illustrates exemplary electronic devices operating in different physical environments during a communication session, in accordance with some implementations.

FIG. 12 is a flowchart illustrating a method for providing an avatar during a communication session, in accordance with some implementations.

Figure 2:
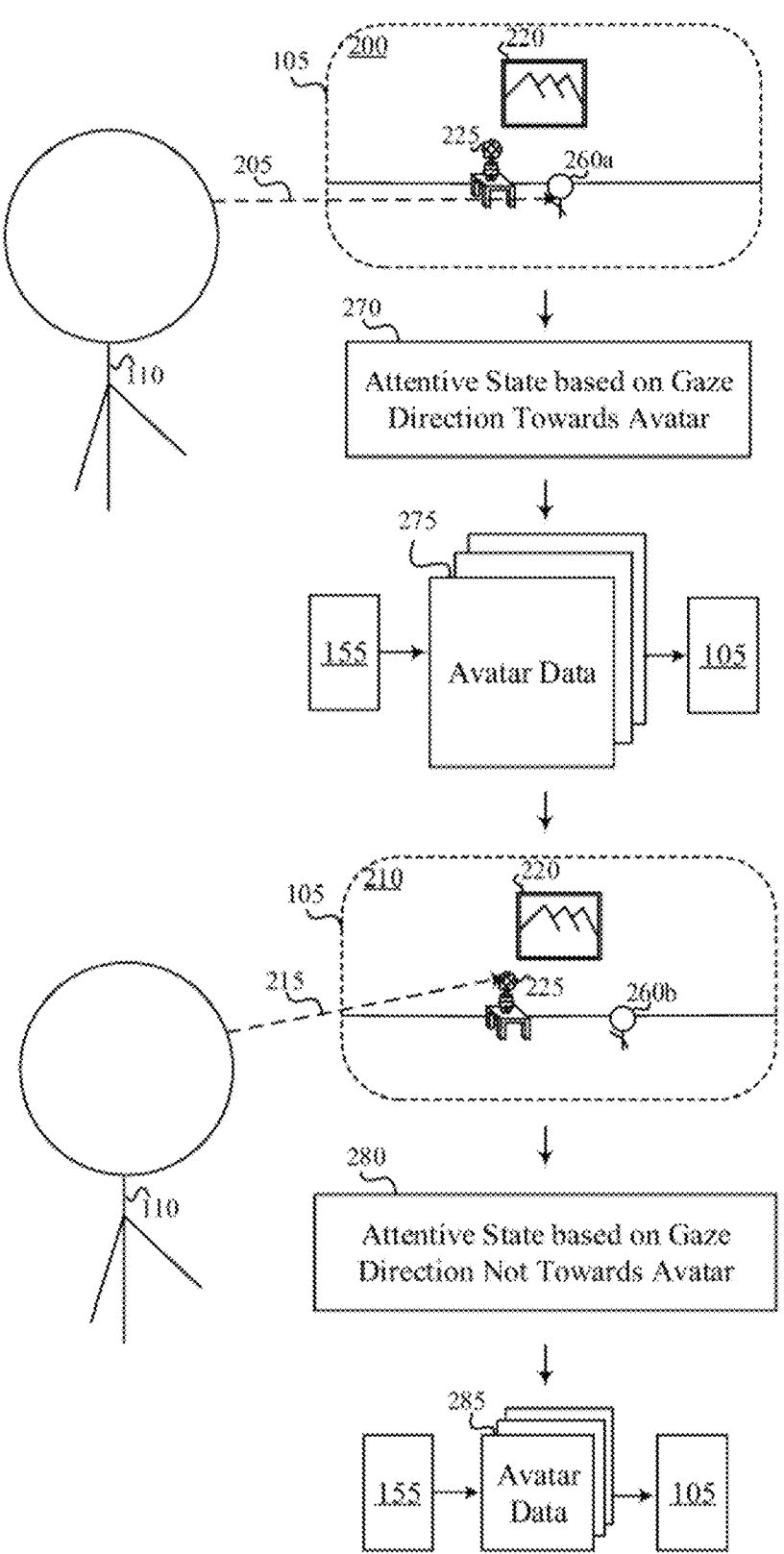
FIGS. 2, 3, 4, 5, 6, 7, 8, 9, 10, and 11 illustrate changes in avatar data during communication sessions based on exemplary indicia regarding the attentive states of a user, in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

FIG. 1 illustrates exemplary electronic devices 105, 155 operating in different physical environments 100, 150. Such environments may be remote from one another, e.g., not located within the same room, building, complex, town, etc. In FIG. 1, the physical environment 100 is a room that includes a first user 110, the first user's wall-hung painting 120, and the first user's flowers 125. The physical environment 100 also includes walls, a floor, and a ceiling. The physical environment 150 is a different room that includes a second user 160, the second user's couch 170, the second user's table 180, and the second user's wall-hung painting 165. The physical environment 150 also includes walls, a floor, and a ceiling.

The electronic devices 105, 155 may each include one or more cameras, microphones, depth sensors, or other sensors that can be used to capture information about and evaluate their respective physical environments 100, 150 and the objects within those environments 100, 150, as well as information about the users 110, 160, respectively. Each device 105, 155 may use information about its respective physical environment and user that it obtains from its sensors to provide visual and audio content to view or share content during a communication session.

The electronic devices 105, 155 communicate with one another directly or indirectly (e.g., via an intermediary device or server) to share content during a communication session. For example, electronic device 105 may share audio and image content captured in physical environment 100 and that shared content may be played audibly and displayed visually on electronic device 155 in real time during the communication session. Similarly, electronic device 155 may share audio and image content captured in physical environment 150 and that shared content may be played audibly and displayed visually on electronic device 105 in real time during the communication session.

Some of the shared content may be based on sensor data corresponding to the users 110, 160. For example, electronic device 105 may capture sensor data including images, audio, depth data, motion data, etc. that corresponds to the visual appearance, movements, and sounds of the user 110. The electronic device 105 may share this avatar data in the communication session such that electronic device 155 can use it to present an avatar of the user 110. Similarly, electronic device 155 may capture sensor data including images, audio, depth data, motion data, etc. that corresponds to the visual appearance, movements, and sounds of the user 160. The electronic device 155 may share this avatar data in the communication session such that electronic device 105 can use it to display an avatar of the user 160. The avatar data that is shared may be streamed or otherwise correspond to the appearance and movements of the users 110, 160 that occur over time. The avatar data may correspond to a "live" or otherwise current appearance of the respective user.

The avatar data may correspond to a 2D or 3D appearance of the respective user. In some implementations, the avatar data comprises a texture and a 3D skeleton, where the avatar is displayed by applying the appearance of the texture to a 3D shape provided by the 3D skeleton. In some implementations, the avatar data is a 3D video that includes frames of texture images (e.g., 2D images) and skeletal data. In some implementations, the avatar is created by a recipient/viewer using live sensor data (e.g., a live-streamed 3D video) along with previously-obtained avatar data. The previously-obtained avatar data may include enrollment data including data about portions of the user that may not be captured during the live communication session, such as a user representation based on images of the user's entire face without head-mounted device (HMD) occlusion, images of the sides, top, and back of the user's head, images of the user's teeth, images of the user's face exhibiting a variety of expressions, etc.

In some implementations, shared avatar data is used to present avatars during the communication session within a 3D environment. According to some implementations, one or both of the electronic devices 105, 155 generate and present an extended reality (XR) environment that is shared by the multiple users during a communication session.

Some implementations provide a communication session in which a first device, e.g., electronic device 105, receives and uses streamed avatar data to render views that include a time-varying avatar, e.g., video content of some or all of another user sent from the other user's device (e.g., electronic device 155) during the communication session. In order to efficiently use resources (e.g., power, bandwidth, etc.), some implementations adapt the avatar provision process (e.g., video framerate, image resolution, etc.) based on system constraints or user context, e.g., whether the viewer is looking at the avatar, whether the avatar is within the viewer's foveal region, whether the avatar is within the viewer's field of view, or whether the user's eye vergence is focused on the avatar.

The avatar data may be adjusted during the communication session based on the context, e.g., based on detecting an indicium of a future attentive state of the user 110. For example, during a first portion of a communication session between electronic device 105 and electronic device 155, the electronic device 105 may obtain first avatar data representing an avatar of the user 160 of the electronic device 155. The electronic device 105 may present the avatar of the second user 160 based on the first avatar data. The electronic device 105 may identify indicium indicative of a future attentive state of the user 110 of the electronic device 105 relative to the avatar of the user 160. Examples of indicium indicative of attentive states include, but are not limited to, whether the user 110 is looking at the avatar of the user 160, whether the avatar of the user 160 is within the foveal region or field of view of the user 110, whether the avatar of the user 160 is close or far away from a viewpoint of the user 110 (e.g., in an XR environment), what the user 110 is doing (e.g., being still, moving, walking, moving his head, etc.), what the user 160 is doing (e.g., talking, starting to move hands, etc.), what the users 110, 160 together are doing or attentive to (e.g., watching TV together, walking side by side, looking at a white board), and the environmental conditions (e.g., lighting, air quality). In accordance with identifying the indicium, the electronic device 105 obtains second avatar data and presents the avatar of the second user based on the second avatar data. Obtaining the second avatar data may involve obtaining the second avatar data representing the avatar of the second user from a remote device (e.g., the device 155 or an intermediate server), wherein a property (e.g., a quality level or frame rate) of the first avatar data is different than a property of the second avatar data.

FIGS. 2-11 illustrate changes in avatar data during communication sessions based on exemplary indicia regarding the attentive states of a user, in accordance with some implementations.

In FIG. 2, during the communication session, electronic device 105 displays a view 200 including a depiction 220 of wall-hung painting 120, a depiction 225 of flowers 125, and avatar 260a. At block 270, an attentive state of user 110 is determined based on the gaze direction of user 110 being towards the avatar 260a. In this example, the gaze direction 205 is detected, e.g., the electronic device 105 determines that the user 110 is gazing at the avatar 260a displayed in the view 200 by the electronic device 105. In this example, the viewing user (e.g., user 110) gazing at the avatar 260a is considered an indicium that a future attentive state of the user 110 will involve focusing attention on the avatar 260a, e.g., the user 110 will continue looking at/paying attention to the avatar 260a.

Based on identifying this indicium or predicting this future attentive state, it may be desirable to utilize avatar data that has a particular property (e.g., a relatively high frame rate, a relatively high-resolution texture, a relatively complex skeleton, etc.). If avatar data having such a property is not being used already, the avatar provision process is adjusted to use avatar data having that property. For example, the electronic device 105 may send a message to an avatar data source (e.g., the electronic device 155 or an intermediary device) requesting that future avatar data have the particular property and the avatar data source may respond accordingly. The electronic device 105 may receive new avatar data and display the avatar based on such data. For example, as illustrated, electronic device 155 may send avatar data 275 having the particular property to the electronic device 105, and electronic device 105 may then use that avatar data 275 to display the avatar 260b in view 210. In another example, the electronic device 105 sends the indicium to the avatar data source and the avatar data source (e.g., the electronic device 155 or an intermediary device) determines how to configure one or more avatar data properties accordingly.

Avatar data 275 may be provided over time, e.g., as a stream of data corresponding to different times, e.g., frame data corresponding to different frame times. In one example, while user 110 is gazing at the avatar 260b, a stream of avatar frame data having a first property (e.g., avatar data 275) is received and used to display the avatar and, after it is detected that the user 110 is not gazing (or about to not gaze) at the avatar (which may be an indicium that the attentive state of user 110 has shifted away from the avatar), a stream of avatar frame data having a second (different) property (e.g., avatar data 285) is received and used to display the avatar.

As shown at block 280, an attentive state is determined based on gaze direction not being towards the avatar 260b. In this example, the gaze direction 215 is detected and the electronic device 105 determines that the user 110 is not gazing at the avatar 260b but rather gazing at the depiction 225 of the flowers 125. In this example, the viewing user (e.g., user 110) is not gazing at the avatar 260b (the gaze direction 215 is towards the depiction 225 of the flowers 125) and this gazing at something other than the avatar 260b is considered an indicium that a future attentive state of the user 110 will involve not focusing attention on the avatar.

Based on identifying this indicium or predicting this future attentive state, it may be desirable to utilize avatar data that has a particular property (e.g., a relatively low frame rate, a relatively low-resolution texture, a relatively less complex skeleton, etc.). The avatar provision process is adjusted to use avatar data having that property. For example, the electronic device 105 may send a message to an avatar data source (e.g., the electronic device 155 or an intermediary device) requesting that future avatar data have the particular property and the avatar data source may respond accordingly. The electronic device 105 may receive new avatar data and display the avatar based on such data. For example, electronic device 155 may send avatar data 285 having the particular property to the electronic device 105, and electronic device 105 may then use that avatar data 285 to display the avatar in a new view. In another example, the electronic device 105 sends the indicium to the avatar data source and the avatar data source (e.g., the electronic device 155 or an intermediary device) determines how to configure one or more avatar data properties accordingly.

Figure 3:
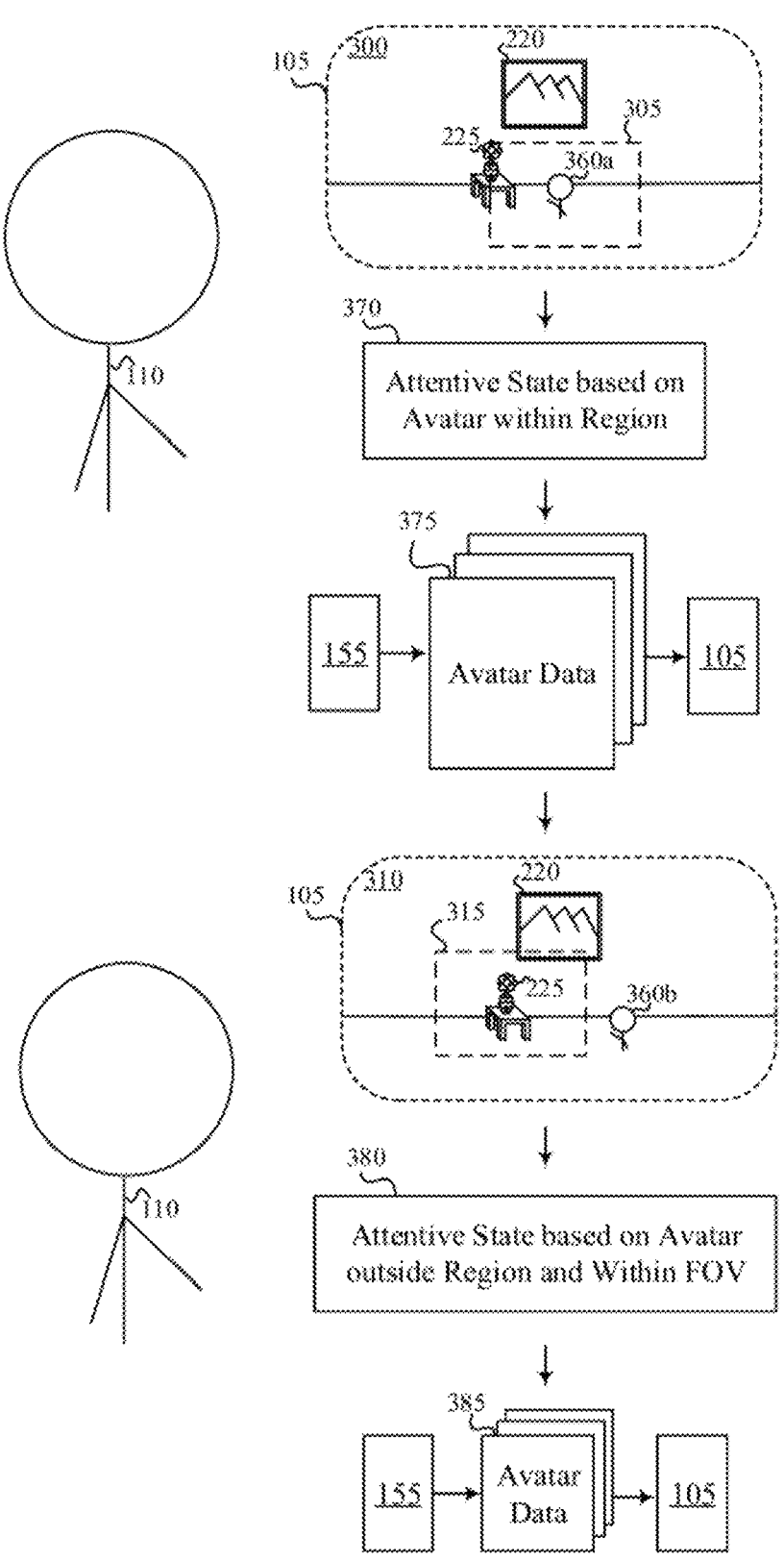

In FIG. 3, during the communication session, electronic device 105 displays a view 300 including a depiction 220 of wall-hung painting 120, a depiction 225 of flowers 125, and avatar 360a. At block 370, an attentive state of user 110 is determined based on the avatar 360a being within a foveal region 305 of the user 110. In this example, the foveal region 305 is detected and the electronic device 105 determines that the avatar 360a displayed in the view 300 by the electronic device 105 is within the foveal region 305 of the user 110. In this example, the viewing user (e.g., user 110) having the avatar 360a within their foveal region 305 is considered an indicium that a future attentive state of the user 110 will involve focusing attention on the avatar 360a, e.g., the user 110 will continue looking at/paying attention to the avatar 360a.

Based on identifying this indicium or predicting this future attentive state, it may be desirable to utilize avatar data that has a particular property (e.g., a relatively high frame rate, a relatively high-resolution texture, a relatively complex skeleton, etc.). If avatar data having such a property is not being used already, the avatar provision process is adjusted to use avatar data having that property. For example, the electronic device 105 may send a message to an avatar data source (e.g., the electronic device 155 or an intermediary device) requesting that future avatar data have the particular property and the avatar data source may respond accordingly. The electronic device 105 may receive new avatar data and display the avatar based on such data. For example, as illustrated, electronic device 155 may send avatar data 375 having the particular property to the electronic device 105, and electronic device 105 may then use that avatar data 375 to display the avatar 360*b* in view 310. In another example, the electronic device 105 sends the indicium to the avatar data source and the avatar data source (e.g., the electronic device 155 or an intermediary device) determines how to configure one or more avatar data properties accordingly.

Avatar data 375 may be provided over time, e.g., as a stream of data corresponding to different times, e.g., frame data corresponding to different frame times. In one example, while the avatar is within the foveal region of the user 110, a stream of avatar frame data having a first property (e.g., avatar data 375) is received and used to display the avatar and, after it is detected that the avatar is no longer within the foveal region of the user 110 (which may be an indicium that the attentive state of user 110 has shifted away from the avatar), a stream of avatar frame data having a second (different) property (e.g., avatar data 385) is received and used to display the avatar.

As shown at block 380, an attentive state is determined based on the avatar 360*b* being outside of the foveal region 315 of the user 110. In this example, the foveal region 315 is detected and the electronic device 105 determines that the avatar 360*b* is not within the foveal zone 315 of the user 110. In this example, the avatar 360*b* is not within the foveal zone 315 of the viewing user (e.g., user 110) and this characteristic is considered an indicium that a future attentive state of the user 110 will involve not focusing attention on the avatar.

Based on identifying this indicium or predicting this future attentive state, it may be desirable to utilize avatar data that has a particular property (e.g., a relatively low frame rate, a relatively low-resolution texture, a relatively less complex skeleton, etc.). The avatar provision process is adjusted to use avatar data having that property. For example, the electronic device 105 may send a message to an avatar data source (e.g., the electronic device 155 or an intermediary device) requesting that future avatar data have the particular property and the avatar data source may respond accordingly. The electronic device 105 may receive new avatar data and display the avatar based on such data. For example, electronic device 155 may send avatar data 385 having the particular property to the electronic device 105, and electronic device 105 may then use that avatar data 385 to display the avatar in a new view. In another example, the electronic device 105 sends the indicium to the avatar data source and the avatar data source (e.g., the electronic device 155 or an intermediary device) determines how to configure one or more avatar data properties accordingly.

Figure 4:
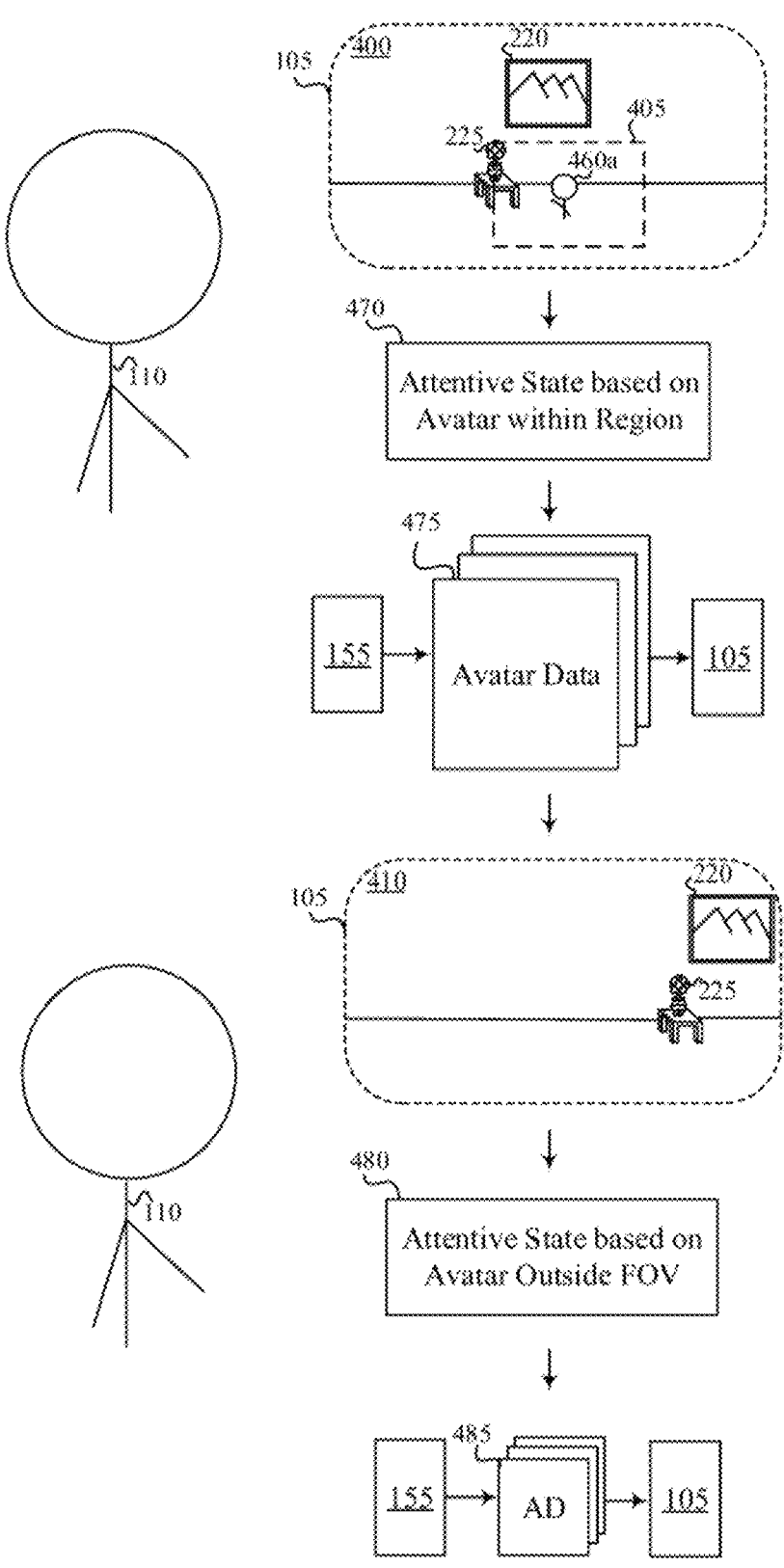

In FIG. 4, during the communication session, electronic device 105 displays a view 400 including a depiction 220 of wall-hung painting 120, a depiction 225 of flowers 125, and avatar 460*a*. At block 470, an attentive state of user 110 is determined based on the avatar 460*a* being within a foveal region 405 of a user 110. In this example, the foveal region 405 is detected and the electronic device 105 determines that the avatar 460*a* displayed in the view 400 by the electronic device 105 is within the foveal region 405 of the user 110. In this example, the viewing user (e.g., user 110) having the avatar 460*a* within their foveal region 405 is considered an indicium that a future attentive state of the user 110 will involve focusing attention on the avatar 460*a*, e.g., the user 110 will continue looking at/paying attention to the avatar 460*a*.

Based on identifying this indicium or predicting this future attentive state, it may be desirable to utilize avatar data that has a particular property (e.g., a relatively high frame rate, a relatively high-resolution texture, a relatively complex skeleton, etc.). If avatar data having such a property is not being used already, the avatar provision process is adjusted to use avatar data having that property. For example, the electronic device 105 may send a message to an avatar data source (e.g., the electronic device 155 or an intermediary device) requesting that future avatar data have the particular property and the avatar data source may respond accordingly. The electronic device 105 may receive new avatar data and display the avatar based on such data. However, as illustrated, the user 110 has turned (changing their viewing direction) and the avatar is no longer within the view 410 being provided by the electronic device 105.

As shown at block 480, an attentive state is determined based on the avatar being outside of the view 410 of the user 110. In this example, the avatar not being the view is considered an indicium that a future attentive state of the user 110 will involve not focusing attention on the avatar.

Based on identifying this indicium or predicting this future attentive state, it may be desirable to utilize avatar data that has a particular property (e.g., a relatively low frame rate, a relatively low-resolution texture, a relatively less complex skeleton, etc.). Indeed, if the avatar is not expected to be displayed based on the predicted future attentive state, minimal (or no) avatar data may be provided, e.g., providing just avatar positional data, avatar sound data, etc. The avatar provision process may be adjusted to use avatar data having the desired property. For example, the electronic device 105 may send a message to an avatar data source (e.g., the electronic device 155 or an intermediary device) requesting that future avatar data have the particular property and the avatar data source may respond accordingly. For example, electronic device 155 may send avatar data 485 having the particular property to the electronic device 105. In another example, the electronic device 105 sends the indicium to the avatar data source and the avatar data source (e.g., the electronic device 155 or an intermediary device) determines how to configure one or more avatar data properties accordingly.

Figure 5:
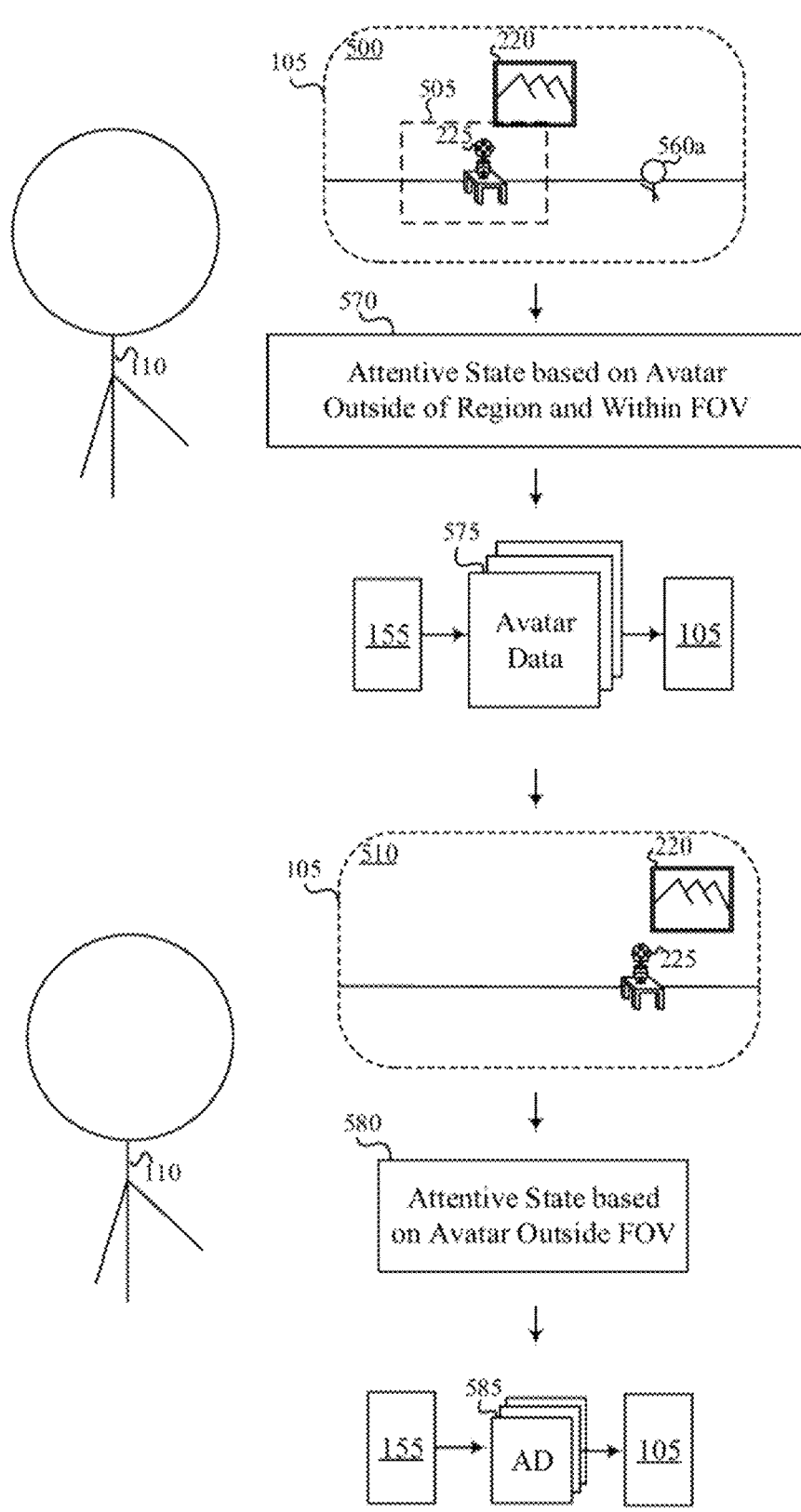

In FIG. 5, during the communication session, electronic device 105 displays a view 500 including a depiction 220 of wall-hung painting 120, a depiction 225 of flowers 125, and avatar 560*a*. At block 570, an attentive state of user 110 is determined based on the avatar 560*a* being outside of a foveal region 505 of a user 110 and within the field of view. In this example, the foveal region 505 is detected and the electronic device 105 determines that the avatar 560*a* displayed in the view 500 by the electronic device 105 is not within the foveal region 505 of the user 110. In this example, the viewing user (e.g., user 110) having the avatar 560*a* outside of their foveal region 505 but within their field of view is considered an indicium that a future attentive state of the user 110 will involve focusing less than full attention the avatar 560a, e.g., the user 110 will continue focusing their primary attention on something other than the avatar 560a but may have some awareness of the avatar 560a since it remains in view.

Based on identifying this indicium or predicting this future attentive state, it may be desirable to utilize avatar data that has a particular property (e.g., a particular frame rate, a particular resolution texture, a particular level of complexity of an avatar skeleton, etc.). If avatar data having such a property is not being used already, the avatar provision process is adjusted to use avatar data having that property. For example, the electronic device 105 may send a message to an avatar data source (e.g., the electronic device 155 or an intermediary device) requesting that future avatar data have the particular property and the avatar data source may respond accordingly. The electronic device 105 may receive new avatar data and display the avatar based on such data. However, as illustrated, the user 110 has turned (changing their viewing direction) and the avatar is no longer within the view 510 being provided by the electronic device 105.

As shown at block 580, an attentive state is determined based on the avatar being outside of the view 510 of the user 110. In this example, the avatar not being the view is considered an indicium that a future attentive state of the user 110 will involve not focusing attention on the avatar.

Based on identifying this indicium or predicting this future attentive state, it may be desirable to utilize avatar data that has a particular property (e.g., a relatively low frame rate, a relatively low-resolution texture, a relatively less complex skeleton, etc.). Indeed, if the avatar is not expected to be displayed based on the predicted future attentive state, minimal (or no) avatar data may be provided, e.g., providing just avatar positional data, avatar sound data, etc. The avatar provision process may be adjusted to use avatar data having the desired property. For example, the electronic device 105 may send a message to an avatar data source (e.g., the electronic device 155 or an intermediary device) requesting that future avatar data have the particular property and the avatar data source may respond accordingly. For example, electronic device 155 may send avatar data 585 having the particular property to the electronic device 105, and electronic device 105. In another example, the electronic device 105 sends the indicium to the avatar data source and the avatar data source (e.g., the electronic device 155 or an intermediary device) determines how to configure one or more avatar data properties accordingly.

Figure 6:
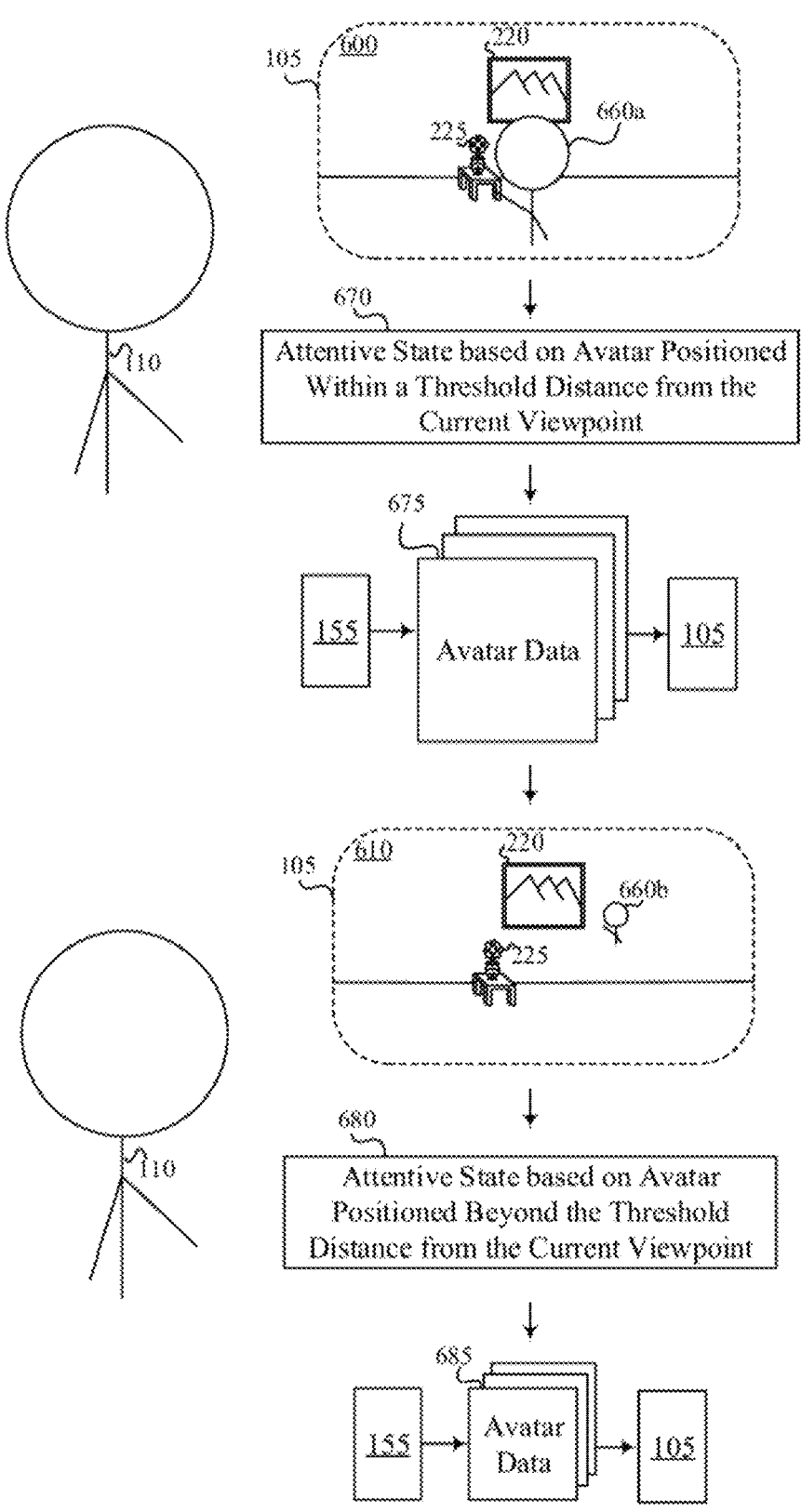

In FIG. 6, during the communication session, electronic device 105 displays a view 600 including a depiction 220 of wall-hung painting 120, a depiction 225 of flowers 125, and avatar 660a. At block 670, an attentive state of user 110 is determined based on the avatar 660a being positioned within a threshold distance from the current viewpoint of the user 110. For example, the view 600 may be displayed based on generating an extended reality (XR) environment, positioning the avatar at a 3D position within the XR environment, and then providing a view of the XR environment based on a viewpoint of the user 110 within the XR environment, e.g., where the viewpoint may change as the user 110 moves or otherwise provides input. In a specific example, such an XR environment is generated based (at least in part) on the physical environment 100 of the user 110 and the avatar is positioned at a 3D position within the corresponding 3D coordinate system of the XR environment (which also corresponds to the 3D coordinate system of the physical environment 100 in this example). The electronic device 105 may determine that a position of the avatar 660a is within a threshold distance from the current viewpoint of the user 110 in the 3D coordinate system. In this example, the position of the avatar 660a being within the threshold distance from the current viewpoint of the user 110 is considered an indicium that a future attentive state of the user 110 will involve focusing attention on the avatar 660a, e.g., the user 110 will continue directing attention to the avatar 660a.

Based on identifying this indicium or predicting this future attentive state, it may be desirable to utilize avatar data that has a particular property (e.g., a relatively high frame rate, a relatively high-resolution texture, a relatively complex skeleton, etc.). If avatar data having such a property is not being used already, the avatar provision process is adjusted to use avatar data having that property. For example, the electronic device 105 may send a message to an avatar data source (e.g., the electronic device 155 or an intermediary device) requesting that future avatar data have the particular property and the avatar data source may respond accordingly. The electronic device 105 may receive new avatar data and display the avatar based on such data. For example, as illustrated, electronic device 155 (or an intermediary device) may send avatar data 675 having the particular property to the electronic device 105.

Avatar data 675 may be provided over time, e.g., as a stream of data corresponding to different times, e.g., frame data corresponding to different frame times. In one example, while the position of the avatar 660a is within the threshold distance from the current viewpoint of the user 110, a stream of avatar frame data having a first property (e.g., avatar data 675) is received and used to display the avatar and, after it is detected that position of the avatar 660b is no longer within a threshold distance from the current viewpoint of the user 110 (which may be an indicium that the attentive state of user 110 has shifted away from the avatar), a stream of avatar frame data having a second (different) property (e.g., avatar data 685) is received and used to display the avatar.

As shown at block 680, an attentive state is determined based on the position of the avatar 660b being beyond the threshold distance from the current viewpoint of the user 110. In this example, the position of the avatar 660b being beyond the threshold distance from the current viewpoint of the user 110 is considered an indicium that a future attentive state of the user 110 will involve not focusing attention on the avatar.

Based on identifying this indicium or predicting this future attentive state, it may be desirable to utilize avatar data that has a particular property (e.g., a relatively low frame rate, a relatively low-resolution texture, a relatively less complex skeleton, etc.). If not being used already, the avatar provision process is adjusted to use avatar data having that property. For example, the electronic device 105 may send a message to an avatar data source (e.g., the electronic device 155 or an intermediary device) requesting that future avatar data have the particular property and the avatar data source may respond accordingly. The electronic device 105 may receive new avatar data and display the avatar based on such data. For example, electronic device 155 may send avatar data 685 having the particular property to the electronic device 105, and electronic device 105 may then use that avatar data 685 to display the avatar in a new view. In another example, the electronic device 105 sends the indicium to the avatar data source and the avatar data source (e.g., the electronic device 155 or an intermediary device) determines how to configure one or more avatar data properties accordingly.

Figure 7:
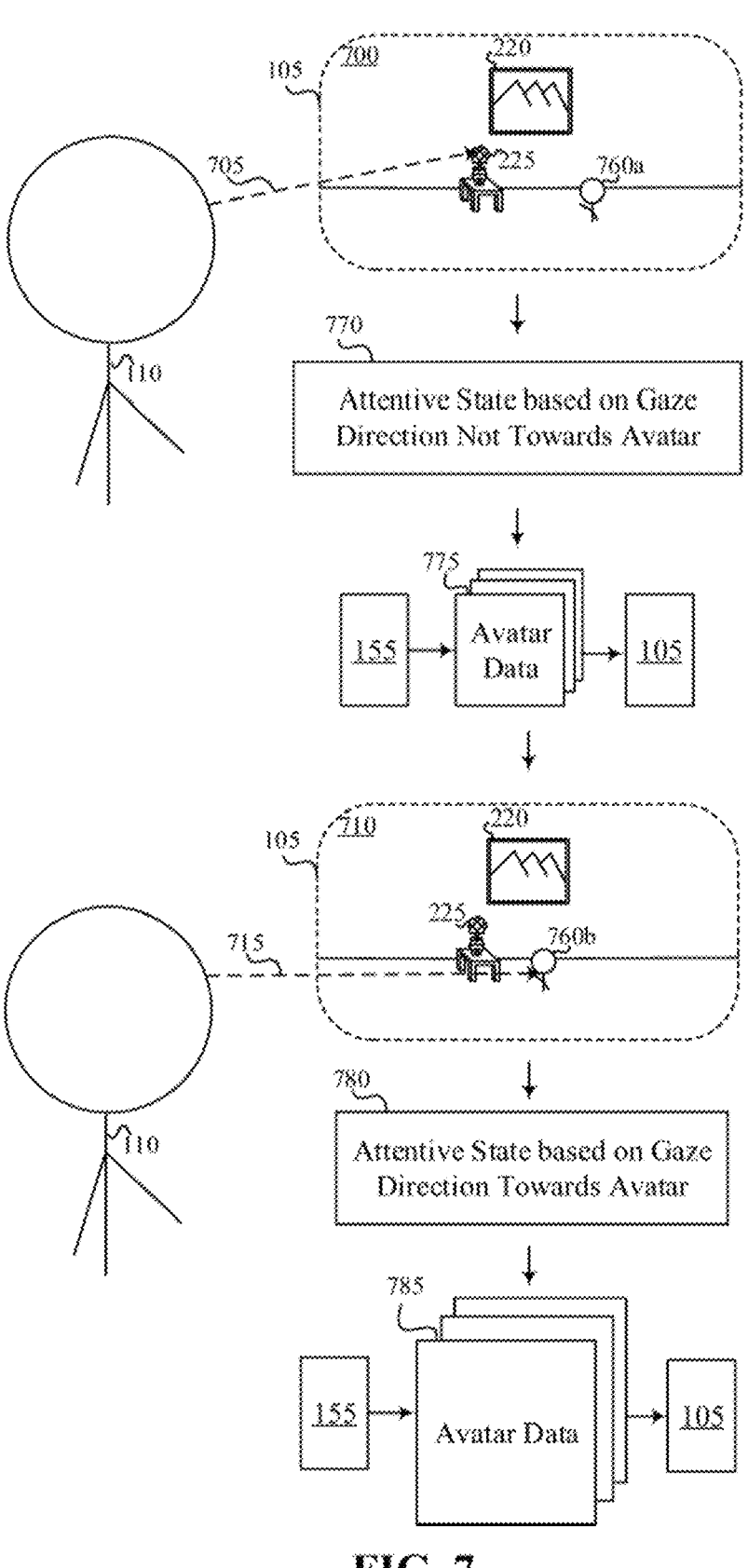

In FIG. 7, during the communication session, electronic device 105 displays a view 700 including a depiction 220 of wall-hung painting 120, a depiction 225 of flowers 125, and avatar 760*a*. At block 770, an attentive state of user 110 is determined based on gaze direction 705 being towards the depiction 225 of the flowers 125. In this example, the gaze direction 705 is detected and the electronic device 105 determines that the user 110 is gazing at the depiction 225 rather than the avatar 760*a* displayed in the view 700 by the electronic device 105. In this example, the viewing user (e.g., user 110) not gazing at the avatar 760*a* is considered an indicium that a future attentive state of the user 110 will involve not focusing attention on the avatar 760*a*, e.g., the user 110 will continue not looking at/paying attention to the avatar 760*a*. In some implementations, the attentive state is predicted based on how far the gaze direction 705 deviates from a gaze direction at the avatar 760*a*.

Based on identifying this indicium or predicting this future attentive state, it may be desirable to utilize avatar data that has a particular property (e.g., a relatively low frame rate, a relatively low-resolution texture, a relatively low complexity skeleton, etc.). If avatar data having such a property is not being used already, the avatar provision process is adjusted to use avatar data having that property. For example, the electronic device 105 may send a message to an avatar data source (e.g., the electronic device 155 or an intermediary device) requesting that future avatar data have the particular property and the avatar data source may respond accordingly. The electronic device 105 may receive new avatar data and display the avatar based on such data. For example, as illustrated, electronic device 155 may send avatar data 775 having the particular property to the electronic device 105, and electronic device 105 may then use that avatar data 775 to display the avatar 760*b* in view 710. In another example, the electronic device 105 sends the indicium to the avatar data source and the avatar data source (e.g., the electronic device 155 or an intermediary device) determines how to configure one or more avatar data properties accordingly.

Avatar data 775 may be provided over time, e.g., as a stream of data corresponding to different times, e.g., frame data corresponding to different frame times. In one example, while user 110 is gazing at the depiction 225 of the flowers 125 (or other content different than the avatar), a stream of avatar frame data having a first property (e.g., avatar data 775) is received and used to display the avatar and, after it is detected that the user 110 is gazing (or about to gaze) at the avatar (which may be an indicium that the attentive state of user 110 has shifted to the avatar), a stream of avatar frame data having a second (different) property (e.g., avatar data 785) is received and used to display the avatar.

As shown at block 780, an attentive state is determined based on gaze direction being towards the avatar 760*b*. In this example, the gaze direction 715 is detected and the electronic device 105 determines that the user 110 is gazing at the avatar 760*b*. In this example, the viewing user (e.g., user 110) is gazing at the avatar 760*b* (the gaze direction 715 is towards the avatar 760*b*) and this gazing is considered an indicium that a future attentive state of the user 110 will involve focusing attention on the avatar. In some implementations, the user's gaze direction is detected as it moves from the depiction 225 towards the avatar 760*b* and the attentive state of the user focusing on the avatar is predicted prior to the gaze actually reaching the avatar.

Based on identifying this indicium or predicting this future attentive state, it may be desirable to utilize avatar data that has a particular property (e.g., a relatively high frame rate, a relatively high-resolution texture, a relatively more complex skeleton, etc.). If not being used already, the avatar provision process is adjusted to use avatar data having that property. For example, the electronic device 105 may send a message to an avatar data source (e.g., the electronic device 155 or an intermediary device) requesting that future avatar data have the particular property and the avatar data source may respond accordingly. The electronic device 105 may receive new avatar data and display the avatar based on such data. For example, electronic device 155 may send avatar data 785 having the particular property to the electronic device 105, and electronic device 105 may then use that avatar data 785 to display the avatar in a new view. In another example, the electronic device 105 sends the indicium to the avatar data source and the avatar data source (e.g., the electronic device 155 or an intermediary device) determines how to configure one or more avatar data properties accordingly.

Figure 8:
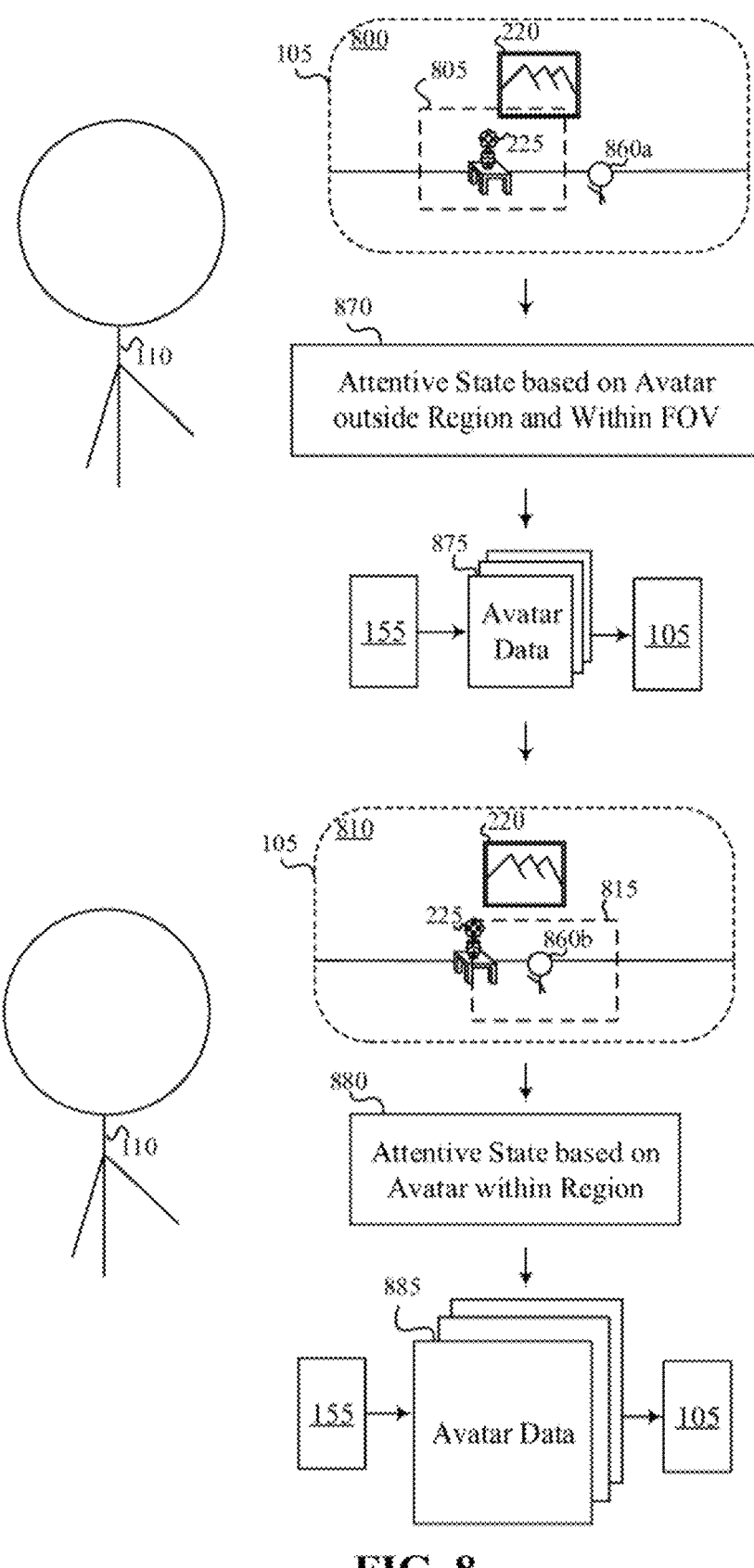

In FIG. 8, during the communication session, electronic device 105 displays a view 800 including a depiction 220 of wall-hung painting 120, a depiction 225 of flowers 125, and avatar 860*a*. At block 870, an attentive state of user 110 is determined based on the avatar 860*a* being outside a foveal region 805 of the user 110. In this example, the foveal region 805 is detected and the electronic device 105 determines that the avatar 860*a* displayed in the view 800 by the electronic device 105 is outside of the foveal region 805 of the user 110. In this example, the viewing user (e.g., user 110) having the avatar 860*a* outside of their foveal region 805 is considered an indicium that a future attentive state of the user 110 will involve not focusing attention on the avatar 860*a*, e.g., the user 110 will not directly focus on the avatar.

Based on identifying this indicium or predicting this future attentive state, it may be desirable to utilize avatar data that has a particular property (e.g., a relatively low frame rate, a relatively low-resolution texture, a relatively less complex skeleton, etc.). If avatar data having such a property is not being used already, the avatar provision process is adjusted to use avatar data having that property. For example, the electronic device 105 may send a message to an avatar data source (e.g., the electronic device 155 or an intermediary device) requesting that future avatar data have the particular property and the avatar data source may respond accordingly. The electronic device 105 may receive new avatar data and display the avatar based on such data. For example, as illustrated, electronic device 155 may send avatar data 875 having the particular property to the electronic device 105, and electronic device 105 may then use that avatar data 875 to display the avatar 860*b* in view 810. In another example, the electronic device 105 sends the indicium to the avatar data source and the avatar data source (e.g., the electronic device 155 or an intermediary device) determines how to configure one or more avatar data properties accordingly.

Avatar data 875 may be provided over time, e.g., as a stream of data corresponding to different times, e.g., frame data corresponding to different frame times. In one example, while the avatar is within the foveal region of the user 110, a stream of avatar frame data having a first property (e.g., avatar data 875) is received and used to display the avatar and, after it is detected that the avatar is no longer within the foveal region of the user 110 (which may be an indicium that the attentive state of user 110 has shifted away from the avatar), a stream of avatar frame data having a second (different) property (e.g., avatar data 885) is received and used to display the avatar.

As shown at block 880, an attentive state is determined based on the avatar 360*b* being within the foveal region 815 of the user 110. In this example, the foveal region 815 is detected and the electronic device 105 determines that the avatar 860*b* is within the foveal zone 815 of the user 110. In this example, the avatar 860*b* is within the foveal zone 815 of the viewing user (e.g., user 110) and this characteristic is considered an indicium that a future attentive state of the user 110 will involve focusing attention on the avatar.

Based on identifying this indicium or predicting this future attentive state, it may be desirable to utilize avatar data that has a particular property (e.g., a relatively high frame rate, a relatively high-resolution texture, a relatively more complex skeleton, etc.). If not being used already, the avatar provision process is adjusted to use avatar data having that property. For example, the electronic device 105 may send a message to an avatar data source (e.g., the electronic device 155 or an intermediary device) requesting that future avatar data have the particular property and the avatar data source may respond accordingly. The electronic device 105 may receive new avatar data and display the avatar based on such data. For example, electronic device 155 may send avatar data 885 having the particular property to the electronic device 105, and electronic device 105 may then use that avatar data 885 to display the avatar in a new view. In another example, the electronic device 105 sends the indicium to the avatar data source and the avatar data source (e.g., the electronic device 155 or an intermediary device) determines how to configure one or more avatar data properties accordingly.

Figure 9:
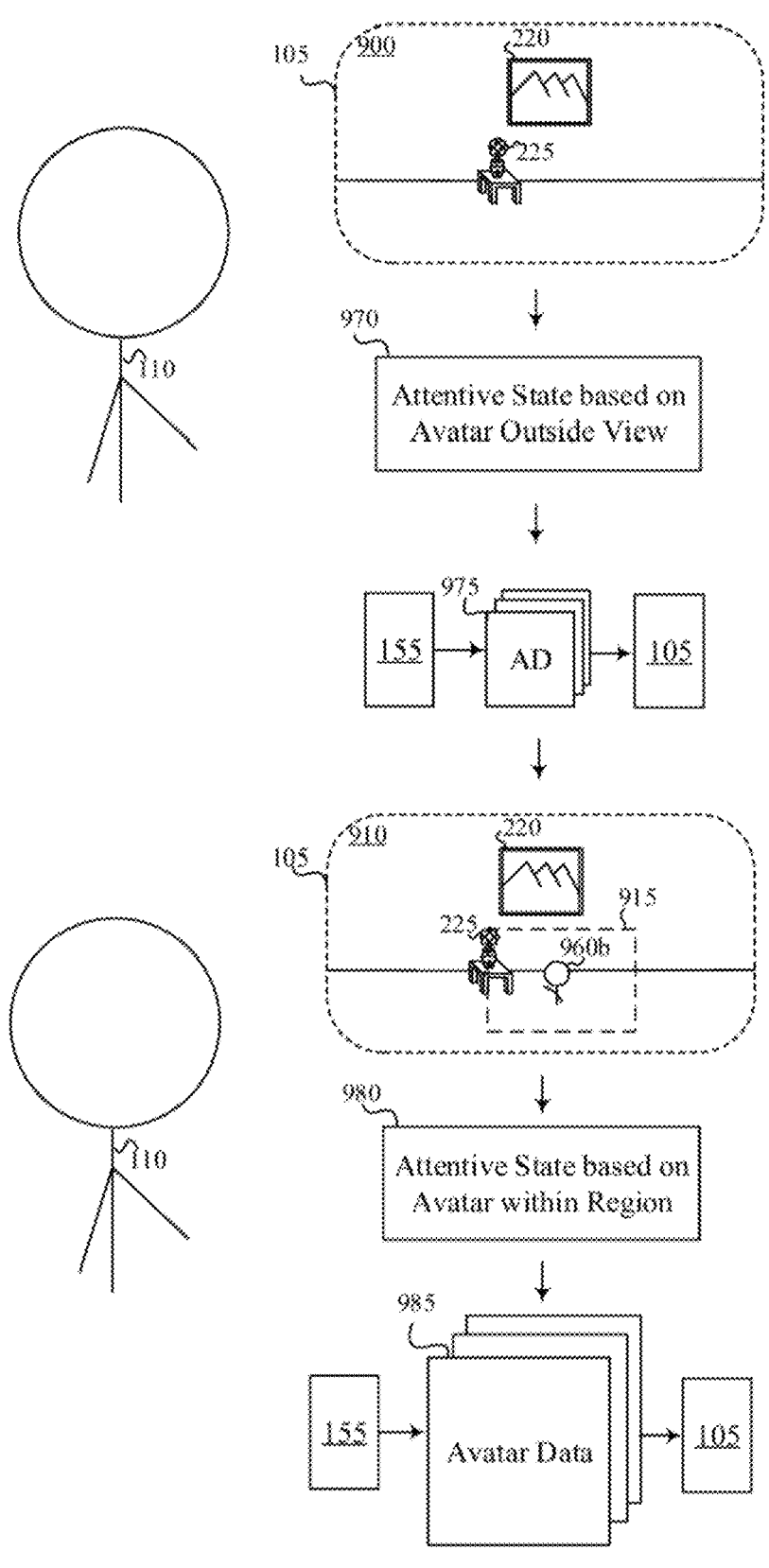

In FIG. 9, during the communication session, electronic device 105 displays a view 900 including a depiction 220 of wall-hung painting 120, a depiction 225 of flowers 125. Avatar data is being sent to device 105. However, the avatar's positional data does not position the avatar within the view 900, e.g., the avatar may be positioned in an XR environment depicted in the view 900 but at a position to the side of the portion of the XR environment that is depicted in the view 900. At block 970, an attentive state of user 110 is determined based on the avatar not being within the field of view of the user 110. In this example, the electronic device 105 determines that the avatar is not within the field of view. In this example, the avatar not being within the field of view is considered an indicium that a future attentive state of the user 110 will involve not focusing attention on the avatar 960*a*.

Based on identifying this indicium or predicting this future attentive state, it may be desirable to utilize avatar data that has a particular property (e.g., a relatively low frame rate, a relatively low-resolution texture, a relatively less complex skeleton, etc.). Indeed, if the avatar is not expected to be displayed based on the predicted future attentive state, minimal (or no) avatar data may be provided, e.g., providing just avatar positional data, avatar sound data, etc. If avatar data having such a property is not being used already, the avatar provision process is adjusted to use avatar data having that property. For example, the electronic device 105 may send a message to an avatar data source (e.g., the electronic device 155 or an intermediary device) requesting that future avatar data have the particular property and the avatar data source may respond accordingly.

As shown at block 980, an attentive state is determined based on the avatar 960*b* being positioned within a foveal region 915 within the view 910 of the user 110. In this example, the avatar being within the foveal region 915 is considered an indicium that a future attentive state of the user 110 will involve focusing attention on the avatar.

Based on identifying this indicium or predicting this future attentive state, it may be desirable to utilize avatar data that has a particular property (e.g., a relatively high frame rate, a relatively high-resolution texture, a relatively more complex skeleton, etc.). The avatar provision process may be adjusted to use avatar data having the desired property. For example, the electronic device 105 may send a message to an avatar data source (e.g., the electronic device 155 or an intermediary device) requesting that future avatar data have the particular property and the avatar data source may respond accordingly. For example, electronic device 155 may send avatar data 985 having the particular property to the electronic device 105, and electronic device 105 may display the avatar in future views. In another example, the electronic device 105 sends the indicium to the avatar data source and the avatar data source (e.g., the electronic device 155 or an intermediary device) determines how to configure one or more avatar data properties accordingly.

Figure 10:
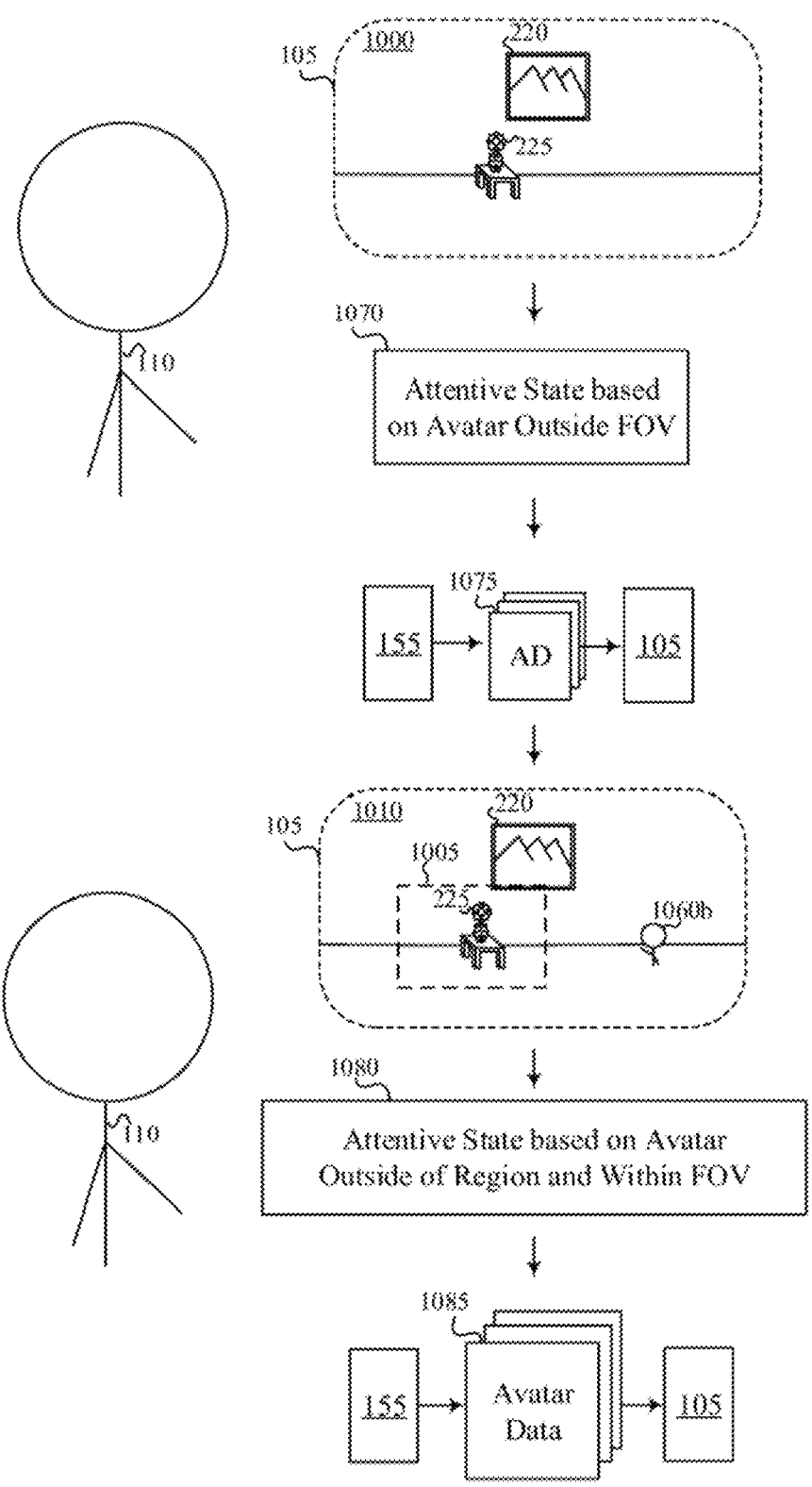

In FIG. 10, during the communication session, electronic device 105 displays a view 1000 including a depiction 220 of wall-hung painting 120 and a depiction 225 of flowers 125. At block 1070, an attentive state of user 110 is determined based on the avatar 560*a* being outside of the field of view of the user 110. In this example, the electronic device 105 determines that the avatar is outside of the field of view (e.g., not displayed in view 1000). In this example, the avatar being outside of the field of view is considered an indicium that a future attentive state of the user 110 will involve not focusing on the avatar.

Based on identifying this indicium or predicting this future attentive state, it may be desirable to utilize avatar data that has a particular property (e.g., a particular frame rate, a particular resolution texture, a particular level of complexity of an avatar skeleton, etc.). Indeed, if the avatar is not expected to be displayed based on the predicted future attentive state, minimal (or no) avatar data may be provided, e.g., providing just avatar positional data, avatar sound data, etc. If avatar data having such a property is not being used already, the avatar provision process is adjusted to use avatar data having that property. For example, the electronic device 105 may send a message to an avatar data source (e.g., the electronic device 155 or an intermediary device) requesting that future avatar data have the particular property and the avatar data source may respond accordingly.

As shown at block 1080, an attentive state is next determined based on the avatar 1060*b* being in the field of view of the user 110 but outside of the foveal region 1015. In this example, the avatar being in the field of view of the user 110 but outside of the foveal region 1015 of the user 110 is considered an indicium that a future attentive state of the user 110 will involve not focusing direct attention on the avatar but having some awareness or indirect attention focused on the avatar 1060*b*.

Based on identifying this indicium or predicting this future attentive state, it may be desirable to utilize avatar data that has a particular property (e.g., a medium frame rate, a medium resolution texture, a medium complexity skeleton, etc.). The avatar provision process may be adjusted to use avatar data having the desired property. For example, the electronic device 105 may send a message to an avatar data source (e.g., the electronic device 155 or an intermediary device) requesting that future avatar data have the particular property and the avatar data source may respond accordingly. For example, electronic device 155 may send avatar data 1085 having the particular property to the electronic device 105, and electronic device 105. In another example, the electronic device 105 sends the indicium to the avatar data source and the avatar data source (e.g., the electronic device 155 or an intermediary device) determines how to configure one or more avatar data properties accordingly.

Figure 11:
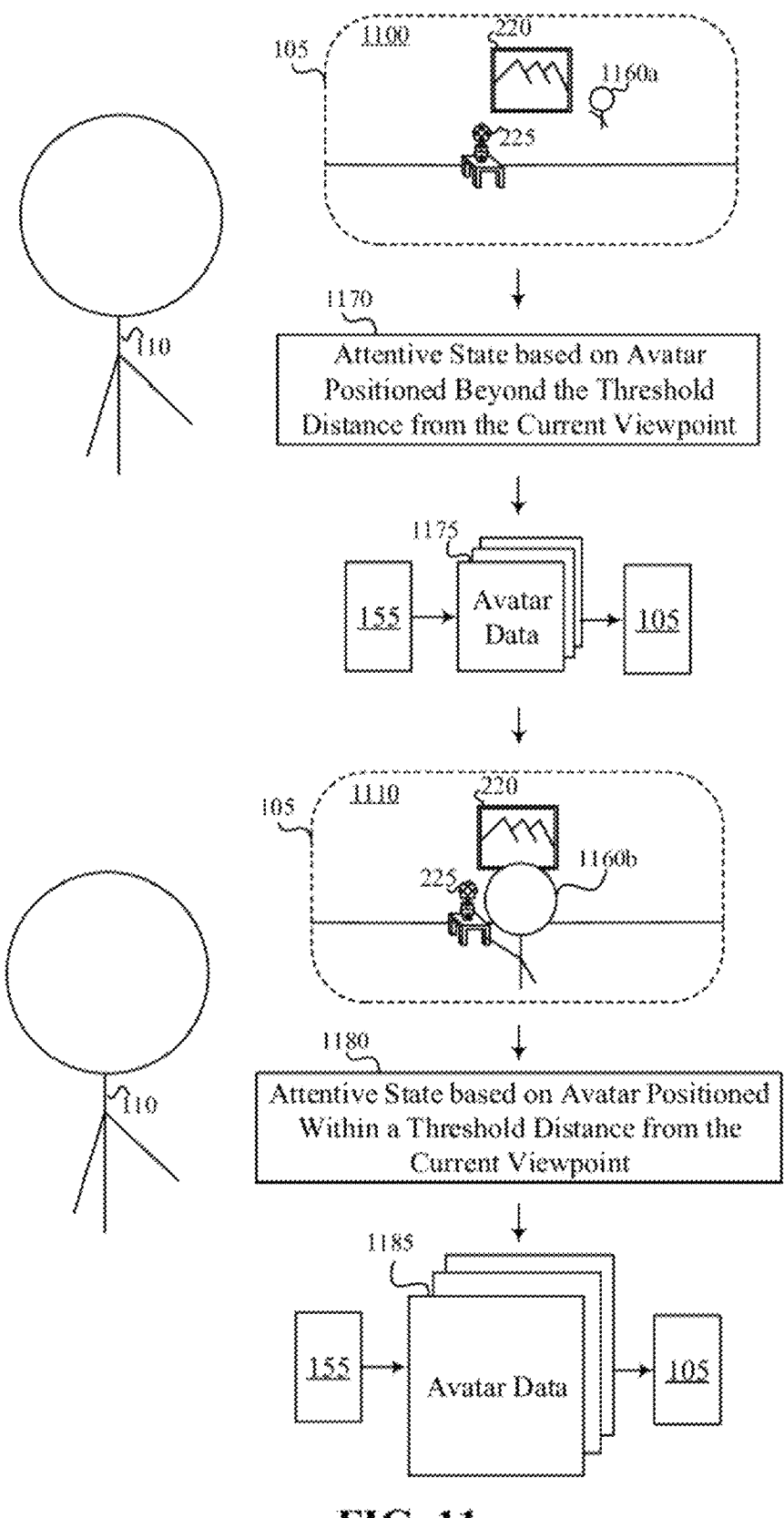

In FIG. 11, during the communication session, electronic device 105 displays a view 1100 including a depiction 220 of wall-hung painting 120, a depiction 225 of flowers 125, and avatar 1160*a*. At block 1170, an attentive state of user 110 is determined based on the avatar 1160*a* being positioned beyond a threshold distance from the current viewpoint of the user 110. For example, the view 1100 may be displayed by generating an extended reality (XR) environment, positioning the avatar at a 3D position within the XR environment, and then providing a view of the XR environment based on a viewpoint of the user 110 within the XR environment, e.g., which may change as the user 110 moves or otherwise provides input. In a specific example, such an XR environment is generated based (at least in part) on the physical environment 100 of the user 110 and the avatar is positioned at a 3D position within the corresponding 3D coordinate system of the XR environment (which also corresponds to the 3D coordinate system of the physical environment 100 in this example). The electronic device 105 may determine that a position of the avatar 1160*a* is beyond a threshold distance from the current viewpoint of the user 110 in the 3D coordinate system. In this example, the position of the avatar 1160*a* being beyond the threshold distance from the current viewpoint of the user 110 is considered an indicium that a future attentive state of the user 110 will involve focusing limited attention on the avatar 1160*a*, e.g., given the distance of the avatar, details of the avatar are unlikely to be noticeable or otherwise focused upon.

Based on identifying this indicium or predicting this future attentive state, it may be desirable to utilize avatar data that has a particular property (e.g., a relatively low frame rate, a relatively low-resolution texture, a relatively less complex skeleton, etc.). If avatar data having such a property is not being used already, the avatar provision process is adjusted to use avatar data having that property. For example, the electronic device 105 may send a message to an avatar data source (e.g., the electronic device 155 or an intermediary device) requesting that future avatar data have the particular property and the avatar data source may respond accordingly. The electronic device 105 may receive new avatar data and display the avatar based on such data. For example, as illustrated, electronic device 155 (or an intermediary device) may send avatar data 1175 having the particular property to the electronic device 105.

Avatar data 1175 may be provided over time, e.g., as a stream of data corresponding to different times, e.g., frame data corresponding to different frame times. In one example, while the position of the avatar 1160*a* is beyond the threshold distance from the current viewpoint of the user 110, a stream of avatar frame data having a first property (e.g., avatar data 1175) is received and used to display the avatar and, after it is detected that position of the avatar 1160*a* is within the threshold distance from the current viewpoint of the user 110 (which may be an indicium that the attentive state of user 110 has shifted towards the avatar or likely to involve details of the avatar), a stream of avatar frame data having a second (different) property (e.g., avatar data 1185) is received and used to display the avatar.

As shown at block 1180, an attentive state is determined based on the position of the avatar 1160*b* being within the threshold distance from the current viewpoint of the user 110. In this example, the position of the avatar 1160*b* being within the threshold distance from the current viewpoint of the user 110 is considered an indicium that a future attentive state of the user 110 will involve focusing attention on the avatar, e.g., focusing on details of the avatar.

Based on identifying this indicium or predicting this future attentive state, it may be desirable to utilize avatar data that has a particular property (e.g., a relatively high frame rate, a relatively high-resolution texture, a relatively more complex skeleton, etc.). If not being used already, the avatar provision process is adjusted to use avatar data having that property. For example, the electronic device 105 may send a message to an avatar data source (e.g., the electronic device 155 or an intermediary device) requesting that future avatar data have the particular property and the avatar data source may respond accordingly. The electronic device 105 may receive new avatar data and display the avatar based on such data. For example, electronic device 155 may send avatar data 1185 having the particular property to the electronic device 105, and electronic device 105 may then use that avatar data 1185 to display the avatar in a new view. In another example, the electronic device 105 sends the indicium to the avatar data source and the avatar data source (e.g., the electronic device 155 or an intermediary device) determines how to configure one or more avatar data properties accordingly.

FIG. 12 is a flowchart illustrating a method 1200 for providing an avatar during a communication session. In some implementations, a device such as electronic device 105 or electronic device 155, or another device, or a combination of two or more of such devices, performs method 1200. In some implementations, method 1200 is performed on a mobile device, desktop, laptop, HMD, ear-mounted device or server device. The method 1200 is performed by processing logic, including hardware, firmware, software, or a combination thereof. In some implementations, the method 1200 is performed on a processor executing code stored in a non-transitory computer-readable medium (e.g., a memory).

At block 1210, the method 1200 obtains, during a communication session between the first device in a first physical environment and a second device in a second physical environment, first avatar data representing an avatar of a second user of the second device. At block 1220, the method 1200 presents the avatar of the second user based on the first avatar data. In some implementations, at the initial stages of a communication session, limited or no information is known about the attentive state of the viewing user. The initial avatar data (e.g., first avatar data) may be provided based on the assumption that the future attentive state of the viewer is initially unknown, e.g., provide the highest quality available given the system constraints. In other cases, the first avatar data is not the initial avatar data or the initial attentive state can be predicted for the initial avatar data and this avatar data is provided according to that initial attentive state prediction.

At block 1230, the method 1200 identifies an indicium indicative of a future attentive state of a first user of the first device relative to the avatar of the second user. The indicium may relate to any context indicative of a user's future attentive state including, but not limited to, whether the first user is looking at the second user's avatar, whether the second user's avatar is within the first user's foveal region or field of view, whether the second user's avatar is close or far away from the first user's viewpoint, what the first user is doing (e.g., being still, moving, walking, moving their head, etc.), what the second user controlling the avatar is doing (e.g., talking, starting to move hands, etc.), what the viewer and other user are doing or being attentive to (watching TV together, walking side by side, looking at a white board), or the environmental conditions (e.g., lighting, air quality).

In one example, the indicium comprises whether a gaze direction of the first user is directed towards the avatar. In another example, the indicium comprises whether the gaze direction of the first user is directed towards an object other than the avatar. In another example, the indicium is an amount of deviation (e.g., angular displacement) of the gaze direction away from the avatar. In another example, the indicium comprises whether the avatar of the second user is within a first region (e.g., foveal region) of a field of view of the first user. In another example, the indicium comprises whether the avatar of the second user is outside the first region and within the field of view of the first user. In another example, the indicium comprises whether the avatar of the second user is outside the field of view of the first user.

In one example, the indicium comprises a proximity of a position of the avatar of second user to a viewpoint of the first user in a 3D environment. In one example, the indicium comprises an activity of the first user in the first physical environment. In one example, the indicium comprises an activity of the second user. In another example, the indicium comprises an object or activity to which the first user is attentive.

In one example, the indicium comprises a priority of two or more avatars participating in the communication session. For example, if another avatar of a third user is involved in the communication session, the indicium may involve a priority of the second user over the third user with respect to avatar provision, e.g., the priority indicating that it is more important to have high quality of the second user's avatar than high quality of the third user's avatar.

In one example, the indicium comprises data identification of an activity or state of the first user. This may involve determining what the first user is doing (e.g., being still, moving, walking, moving their head, etc.) is likely to a future attentive state of the first user relative to the avatar of the second user. For example, if the first user is walking towards the second user, they may be more likely to be attentive to the second user than if the first user is walking away from the second user. As another example, if the first user is moving their head to scan amongst a group of users including the second user, it may be more likely to be attentive to the second user than if the first user has a relatively fixed head position and orientation corresponding to paying attention to something other than the second user.

In one example, the indicium comprises data identification of an activity or state of the second user. This may involve determining what the second user controlling the avatar is doing (e.g., talking, starting to move hands, etc.). For example, if the second user is waving a hand or making a motion towards the first user, such activity may attract the attention of the first user, making it more likely that the first user will be attentive to the second user. As another example, the second user talking to a third user within a proximity threshold and/or as part of the closest group of users to the first user may attract the attention of the first user, making it more likely that the first user will be attentive to the second user. As another example, if the second user is engaged in a conversation (with the first user or another user), this activity may be indicative of the first user being or becoming attentive to the second user. As another example, if the second user is looking down and reading a book or newspaper and not talking (e.g., engaged in a solo activity), this activity may be indicative of the first user being unlikely to be attentive to the second user.

In some implementations, the indicium comprises data provided by or determined based upon one or more physiological sensors, e.g., eye sensors providing data about gaze direction, fixations, saccades, pupil dilations, pupillary responses, etc., breath sensors providing data about breath speed and depth, which may be indicative of how relaxed, attentive, distracted, etc., the viewer is, heart/pulse sensor data providing data about heart rate, electrocardiogram (EKG) data, electroencephalogram (EEG) data, electrooculography (EOG) data, etc. In some implementations, motion sensor data, haptic data, location data, audio sensor data, or ambient light sensor data provide data used to determine indicium of the first user's attentive state.

In some implementations, one or more indicia (that are known or believed to be associated with particular future attentive states) are used without explicitly predicting a future attentive state of the first user. In other words, based on known, assumed, or predicted associations between one or more indicia and one or more attentive states, the indicia can be used directly (e.g., to adjust avatar data) without needed to explicitly or directly determine attentive states.

However, in some other implementations, the method 1200 uses one or more indicia to expressly predict a future attentive state of the first user, which may then be used (e.g., to adjust avatar data).

In accordance with identifying the indicium, the method 1200, at block 1240, obtains second avatar data representing the avatar of the second user from a remote device (e.g., the second device or an intermediate server), where a property of the first avatar data is different than a property of the second avatar data and, at block 1250, presents the avatar of the second user based on the second avatar data. The second avatar data may be obtained based on determining that the indicium satisfies one or more criteria. The second avatar data may be obtained based on determining a future attentive state based on the indicum and then determining that the future attentive state is different than a current attentive state of the first user relative to the avatar of the second user.

In some implementations, obtaining the second avatar data representing the avatar of the second user comprises determining an adjustment to the first avatar data based on the future attentive state and the current attentive state. The attentive state may allow a quality adjustment based on what is required based on the attentive state, e.g., an attentive state requiring high quality avatar data, an attentive state requiring low quality avatar data, or an attentive state not requiring display of avatar but requiring other avatar data regarding position, audio, etc. In some implementations, obtaining the second avatar data comprises transmitting a request comprising a determined adjustment (e.g., of a property of the avatar data) and receiving the second avatar data (e.g., having the requested adjusted property).

Various avatar data properties may be used to achieve one or more benefits, e.g., efficiency, accuracy, etc. In one example, the property of the first avatar data represents a quality level of the first avatar data and the property of the second avatar data represents a quality level of the second avatar data. In one example, the property of the first avatar data represents a complexity level of a mesh or point cloud in the first avatar data, and the property of the second avatar data represents a complexity level of a mesh or point cloud in the second avatar data. In one example, the property of the first avatar data represents a framerate of the first avatar data, and the property of the second avatar data represents a framerate of the second avatar data. In one example, the property of the first avatar data represents an amount of the first avatar data used to represent an appearance and movement of the avatar during a time period, and the property of the second avatar data represents an amount of the second avatar data used to represent an appearance and movement of the avatar during a time period. The difference between the property of the first avatar data and the property of the second avatar data may correspond to a difference in an amount of a computing resource required to obtain, transmit, or render the first avatar data and the second avatar data.

In some implementations, presenting the avatar of the second user based on the first avatar data or presenting the avatar of the second user based on the second avatar data comprises presenting the avatar within a 3D environment. For example, this may involve the first device displaying an extended reality (XR) environment that includes a view of the first environment with the avatar of the second user added.

In some implementations, the second device provides the avatar data directly to the first device (e.g., without an intermediary server). In some implementations, the avatar data is obtained via an intermediary device such as an intermediary server. For example, the second device may transmit the avatar data to an intermediary server that then retransmits the device to the first device. The second device or the intermediary device may limit or adjust the avatar data that is provided.

The avatar data may include various types of information used to present the avatar. For example, the avatar data may include one or more images representing the appearance of the second user captured by one or more image sensors in the second user's physical environment. Such images may depict portions of the second user such as the second user's face, hair, shoulders, arms, hands, torso, legs, etc., or the second user's entire body. Such avatar data may represent the second user from a given viewpoint, e.g., directly in front of where the second user is facing. The avatar data may include data about the 3D geometry or 3D shape of the second user. For example, the avatar data may include or be based on depth data captured via one or more depth sensors in the second user's environment or inferred from other sensor data, e.g., image data. In some implementations, the avatar data includes data for sequential periods of time, e.g., frame-based data.

In some implementations, the avatar data (e.g., the first avatar data, the second avatar data, or both) comprise, for each frame of multiple frames: a texture representing a surface appearance of a portion of the second user, the texture determined based on image sensor data, and a skeleton representing 3D positioning of the portion of the second user. The skeleton may be determined based on sensor data including image data or motion sensor data.

The recipient device (e.g., the first device) uses such data to reconstruct views of the avatar from a given viewpoint (e.g., within a 3D environment). The time-based avatar data may show real-time positioning, body movements, facial movements, facial expressions, hand gestures, eye movements, sounds produced by the second user, or any other representations of what the second user is doing in real-time. The avatar data may be configured to enable presentation of a live 3D video-like representation of some or all of the second user.

In some implementations, as illustrated in FIG. 2, the current attentive state corresponds to the first user gazing towards the avatar (e.g., gazing towards), the future attentive state corresponds to the first user gazing away from the avatar (e.g., gazing away), and the first avatar data is different than (e.g., has more data per time period) than the second avatar data.

In some implementations, as illustrated in FIG. 3, the current attentive state corresponds to the avatar being within a first region (e.g., in foveal region) of a field of view of the first user, the future attentive state corresponds to the avatar being outside the first region and within the field of view of the first user (e.g., out of foveal region but in field of view), and the first avatar data is different than (e.g., has more data per time period) than the second avatar data.

In some implementations, as illustrated in FIG. 4, the current attentive state corresponds to the avatar being within a first region (e.g., in foveal region) of a field of view of the first user, the future attentive state corresponds to the avatar being outside the field of view of the first user (e.g., out of FOV), and the first avatar data is different than (e.g., has more data per time period) than the second avatar data. The second avatar data may include avatar location data and exclude avatar appearance data.

In some implementations, as illustrated in FIG. 5, the current attentive state corresponds to the avatar being outside the first region and within the field of view of the first user (e.g., out of foveal region but in FOV), the future attentive state corresponds to the avatar being outside the field of view of the first user (e.g., out of FOV), and the first avatar data is different than (e.g., has more data per time period) than the second avatar data. The second avatar data may include avatar location data and exclude avatar appearance data.

In some implementations, as illustrated in FIG. 6, the current attentive state corresponds to the avatar being positioned within a threshold distance of a current viewpoint of the first user in a 3D environment (e.g., close), the future attentive state corresponds to the avatar being positioned beyond the threshold distance from the current viewpoint of the first user in the 3D environment (e.g., far), and the first avatar data is different than (e.g., has more data per time period) than the second avatar data.

In some implementations, as illustrated in FIG. 7, the current attentive state corresponds to the first user gazing away from the avatar (e.g., gazing away), the future attentive state corresponds to the first user gazing towards the avatar (e.g., gazing towards), and the first avatar data is different than (e.g., has less data per time period) than the second avatar data.

In some implementations, as illustrated in FIG. 8, the current attentive state corresponds to the avatar being outside a first region of a field of view of the first user and within the field of view of the first user (e.g., out of foveal region but in FOV), the future attentive state corresponds to the avatar being within the first region (e.g., in foveal region) of the field of view of the first user, and the first avatar data is different than (e.g., has less data per time period) than the second avatar data.

In some implementations, as illustrated in FIG. 9, the current attentive state corresponds to the avatar being outside a field of view of the first user (e.g., out of FOV), the future attentive state corresponds to the avatar being within a first region (e.g., in foveal region) of the field of view of the first user, and the first avatar data is different than (e.g., has less data per time period) than the second avatar data. The first avatar data may include avatar location data and exclude avatar appearance data.

In some implementations, as illustrated in FIG. 10, the current attentive state corresponds to the avatar being outside the field of view of the first user (e.g., out of FOV), the future attentive state corresponds to the avatar being outside the first region and within the field of view of the first user (e.g., out of foveal region but in FOV), and the first avatar data is different than (e.g., has less data per time period) than the second avatar data. The first avatar data may include avatar location data and exclude avatar appearance data.

In some implementations, as illustrated in FIG. 11, the current attentive state corresponds to the avatar being positioned beyond a threshold distance from a current viewpoint of the first user in a 3D environment (e.g., far), the current attentive state corresponds to the avatar being positioned within a threshold distance of a current viewpoint of the first user in a 3D environment (e.g., close), and the first avatar data is different than (e.g., has less data per time period) than the second avatar data.

In some implementations, the first device sends avatar data corresponding to the first user during the communication session to enable the second user to view an avatar of the first user. The first and second users may simultaneously view one another's avatars during the communication session. The avatar data of either or both users may be provisioned based on context, e.g., based on indicia indicative the determined or predicted attentive state of the other user, e.g., the viewing user. In some implementations, user devices alter the avatar data that they send, e.g., to reduce the amount of avatar data transmitted based on context. In some implementations, the user devices send the same avatar data (e.g., having the same properties throughout the communication session) and an intermediary device, e.g., a server, produces different versions (e.g., high complexity, low complexity, etc.) of the avatar data depending upon the context to provide to the viewing user device.

In some implementations, the user devices send multiple versions of the avatar data (e.g., for each frame sending two versions of the avatar data having different properties) and the viewing device or an intermediary device selects one of the versions for use by the viewing device depending upon the context (e.g., upcoming future attentive state of the viewer). Thus, in some implementations, the method 1200 further involves concurrently generating third avatar data and fourth avatar data representing an avatar of the first user, where a property of the third avatar data is different than a property of the fourth avatar data and transmitting the third avatar data and fourth avatar data in the communication session.

In some implementations, the method 1200 determines that the future attentive state is the same as (or materially similar to) the current attentive state and, in accordance with the determination that the future attentive state is the same as the current attentive state, continues to present the avatar of the second user based on the second avatar data, e.g., using the same property without adjusting the avatar data.

In some implementations, when the future attentive state is determined to require more avatar data than the current attentive state, the second avatar data is obtained prior to the first user entering the future attentive state. The time at which a user attentive state is expected to change may be predicted and used to ensure that appropriate avatar data (e.g., having the requisite property) is received to satisfy the avatar viewing requirements of the attentive state when it occurs. The method 1200 may have the higher quality avatar data ready before the high-quality data is needed to be displayed to the first user.

In some implementations, the future attentive state is determined based on determining a depth/distance at which the user is gazing, e.g., based on the user's eye vergence. For example, there could be two avatars in the center of the user's field of view with one avatar relatively close and the other avatar relatively far from the viewing user. Depth/distance may be used to predict which of those avatar's the user is (or will be) looking at. Gaze depth information may be obtained, e.g., via images of the user's eyes obtained view image or other sensors, to determine that the user's vergence is at a particular depth/distance or within a particular depth/distance range. In other words, such information may identify how far away the user is focusing, e.g., focusing on something near or something far, and this information may be used to determined how to render the avatar (or portions of the avatar).

In some implementations, avatar quality is determined based on gaze and context. During a communication session in which multiple avatars are presented (e.g., on a mobile device or HMD), there may be significant power concerns with respect to decoding and rendering the one or more avatars at once. Some implementations disclosed herein provide an improved avatar framework with avatar quality adjusted based on (1) whether the avatar is in the fovea region (e.g., the viewer's eyes are looking at the avatar) and (2) whether the avatar is within the field of view of the viewer. To achieve (1), every participant's device may send two avatar video streams, one high quality and one low quality. The receiving participant may switch to the high quality stream when the avatar is within the foveal region, and downgrade to the low-quality stream when the viewer is not looking directly at the avatar. To achieve (2), when an avatar is not within the field of view of the user, then the device may unsubscribe from the video stream altogether. This may involve telling an intermediary streaming server that the viewer's device does not want to receive the avatar video stream at present. When the avatar returns to (or is about to return to) the field of view, the device notifies the intermediary streaming server so that it can start receiving the avatar video stream again.

In some implementations, a viewer's head movements (e.g., velocity) is used to predict that the avatar will move the field of view imminently and subscribe to the video stream preemptively to ensure that the avatar stream is available to render by the time the avatar does make it into the field of view.

In some implementations, the combination of the above two features (1) and (2) above enables a very substantial reduction in the power needed to have multi-user communication sessions, making the presence of multiple avatars in a communication session feasible in device constraint circumstances in which simultaneously using multiple high-quality avatars would not otherwise be feasible, e.g., during communications sessions involving power constrained HMDs and multiple avatars.

The avatar algorithms used on the sender's side may also be relatively power hungry. Avatar arrangement/seating may be used to determine a context to determine avatar data properties. For example, if avatars are sitting on a couch looking in the same direction watching a movie, the system may tell both devices to stop sending avatar appearance data based on estimating that it is unlikely that the user's will look at one another's avatars in the near future.

In some implementations, the system prioritizes amongst multiple avatars. The primary avatar(s) may be identified, e.g., the closest avatar(s), the avatar(s) in the center of the viewer's field of view, the avatars that are focused upon as indicated by eye vergence, etc., and be given a relatively higher quality (e.g., higher frame rate and resolution). The secondary avatar(s) may be identified, e.g., any avatars that are non-primary. The secondary avatars may be rendered scaled primarily by foveation. The secondary avatars may have lower frame rate data (e.g., ~5 fps) and source resolution. Shader scaling may be aligned with the foveation.

Primary and secondary selection may occur frequently (e.g., several times a second) to avoid any perceptible latency.

In some implementations involving multiple avatars within a view, only one of the avatars is rendered at a high quality and the other avatars are rendered at a reduced quality, e.g., using lower resolution/framerate avatar data. This may be preferably than degrading the quality of all avatars equally. Indicia of viewer attentive state may be used to select which avatar or subset of avatars to provide at a higher quality and which to provide at a lower quality.

In some implementations, avatar quality is adjusted based on device or system constraints. If the viewing device is not power constrained (e.g., while it is plugged in and not running on battery), for example, then avatar quality may be high for all avatars regardless of context, e.g., the viewer's future attentive state. However, when the device is power constrained (e.g., running on battery), avatar quality may be adjusted based on context, e.g., the viewer's future attentive state.

In some implementations, more than one indicia are used to predict a viewer's attentive state. Such indicia may be weighted in determining attentive state or how to adjust the avatar provision process.

Figure 13:
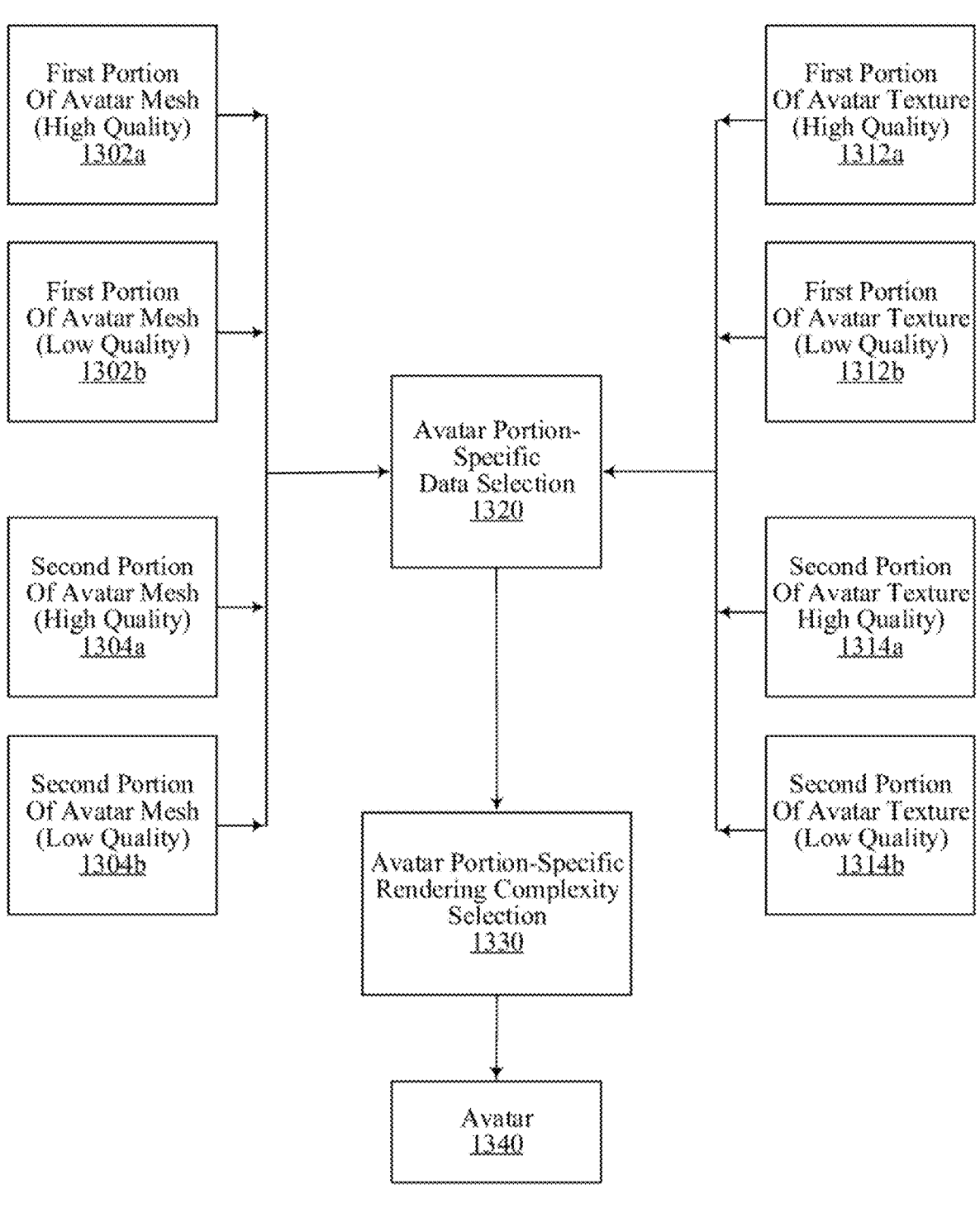
FIG. 13 illustrates selectively using avatar data and rendering processes to present an avatar, in accordance with some implementations.

FIG. 13 illustrates selectively using avatar data and rendering processes to present an avatar. In some implementations, different portions of an avatar may be presented using different data quality and/or rendering processes. For example, if the system determines that the user is looking at an avatar's hands rather than their face, it may render the hands with high quality and the face with lower quality. In FIG. 13, avatar data includes portion specific data, e.g., each portion of the avatar has its own data. Moreover, each portion has mesh and texture data of multiple qualities, e.g., different numbers of mesh triangles, different texture resolutions, etc. Avatar data for a first portion of the avatar (e.g., an avatar's head) includes first portion of avatar mesh (high quality) data 1302a, first portion of avatar mesh (low quality) data 1302b, first portion of avatar texture (high quality) data 1312a, and first portion of avatar texture (low quality) data 1312b. Similarly, avatar data for a second portion of the avatar (e.g., an avatar's hands) includes second portion of avatar mesh (high quality) data 1304a, second portion of avatar mesh (low quality) data 1304b, second portion of avatar texture (high quality) data 1314a, and second portion of avatar texture (low quality) data 1314b.

How an avatar is subdivided into portions may be accomplished using various criteria. In one example, an avatar is subdivided based on portions of the data corresponding to particular regions of 3D space, e.g., cubic regions, etc. In this example, a 2D texture that is stretched, warped, or otherwise not flat in how it is presented in 3D may not be divided into equal 2D segments but may instead be divided in a way that best corresponds to segmentation in 3D.

An avatar 1340 is presented based on selections made based on a user attentive state, e.g., which of the portions of the avatar (if any) at which the user is looking. For example, based on the user looking at the first portion of the avatar, the avatar portion-specific data selection block 1320 may select the first portion of the avatar mesh (high quality) data 1302a, first portion of the avatar texture (high quality) data 1312a, the second portion of the avatar mesh (low quality) data 1304b, and the second portion of the avatar texture (low quality) data 1314b for use in rendering the avatar. Conversely, based on the user looking at the second portion of the avatar, the avatar portion-specific data selection block 1320 may select the first portion of the avatar mesh (low quality) data 1302b, first portion of the avatar texture (low quality) data 1312b, the second portion of the avatar mesh (high quality) data 1304a, and the second portion of the avatar texture (high quality) data 1314a for use in rendering the avatar. Moreover, based on the user looking at neither the first portion of the avatar or the second portion of the avatar, the avatar portion-specific data selection block 1320 may select the first portion of the avatar mesh (low quality) data 1302b, first portion of the avatar texture (low quality) data 1312b, the second portion of the avatar mesh (low quality) data 1304b, and the second portion of the avatar texture (low quality) data 1314b for use in rendering the avatar.

The avatar 1340 may be rendered using such data, e.g., applying the texture data to the mesh data via rendering algorithm. The avatar 1340 may be presented based on selections of parameters, e.g., rendering complexity parameters, based on which portion of the avatar (if any) at which the user is looking. Accordingly, the avatar 1340 may be rendered based on avatar-portion specific rendering complexity selection block 1330 selecting rendering parameters for specific portions of the avatar. If the user is looking at the first portion, the first portion may be rendered using a relatively more complex rendering algorithm while the second portion may be rendered using a relatively less complex rendering algorithm. If the user is looking at the second portion, the first portion may be rendered using a relatively less complex rendering algorithm while the second portion may be rendered using a relatively more complex rendering algorithm. If the user is looking at neither the first portion of the second portion, both the first portion and second may be rendered using a relatively less complex rendering algorithm.

In various implementations, rendering optimizations may be used selectively on select portions of an avatar. Such optimization may include, but are not limited to including, mesh resolutions, animation resolutions, and shader detail/complexity. Mesh resolution optimization may involve selecting an appropriate mesh for a portion of an avatar based on multiple available versions, e.g., multiple resolutions, of that portion of the mesh. Such multiple versions of such a mesh may be transmitted prior to or during the communication session. Optimization may also involve avatar portion-specific rendering fidelity selection to change the quality or complexity of the rendering processes that are performed. In some implementations, this involve substituting a simpler texture for a more detailed texture and vice versa. In some implementations, texture resolution is selected, e.g., 256×256 versus 128×128, etc. Optimization may involve selecting an animation frame rate, e.g., 30 hz versus 60 hz. In some implementations, the optimization may enable a faster or otherwise more efficient lookup of data needed during rendering.

Rending different portions of an avatar using different data qualities or rendering parameters may result in visual anomalies. Such anomalies can be addressed by automatically applying hole filling and smoothing techniques to ensure that transitions between avatar portions do not stand out to the user.

In some implementations, avatar data for different portions of an avatar is generated by the device of the user represented by the avatar and such data is made available via selection or subscription model. In one example, such data is made available via a server and a viewer (e.g., viewing user's device) subscribes to a given quality of data for each avatar portion based on what the user is currently focused upon or otherwise is needed at the moment. Such selective subscription may enable the viewing device to optimize GPU or other processing as well as optimize data transmission.

Figure 14:
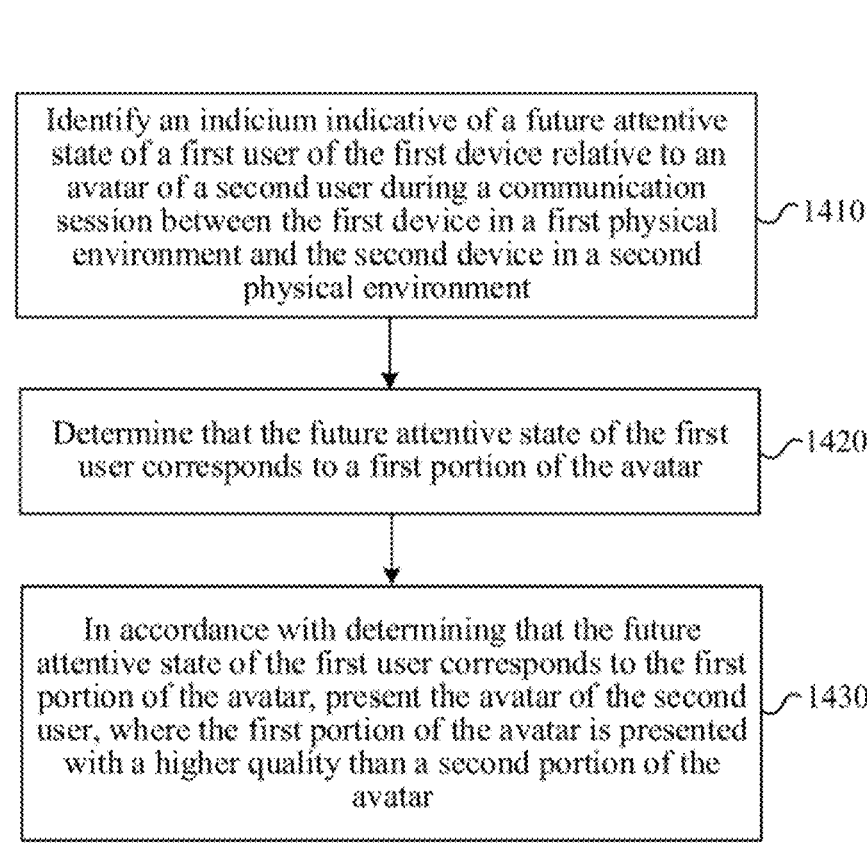
FIG. 14 is a flowchart illustrating a method for presenting portions of an avatar based on a user attentive state, in accordance with some implementations.

FIG. 14 is a flowchart illustrating a method 1400 for presenting portions of an avatar based on a user attentive state, in accordance with some implementations. In some implementations, a device such as electronic device 105 or electronic device 155, or another device, or a combination of two or more of such devices, performs method 1400. In some implementations, method 1400 is performed on a mobile device, desktop, laptop, HMD, ear-mounted device or server device. The method 1400 is performed by processing logic, including hardware, firmware, software, or a combination thereof. In some implementations, the method 1400 is performed on a processor executing code stored in a non-transitory computer-readable medium (e.g., a memory).

At block 1410, the method 1400 identifies an indicium indicative of a future attentive state of a first user of the first device relative to an avatar of a second user during a communication session between the first device in a first physical environment and the second device in a second physical environment.

At block 1420, the method determines that the future attentive state of the first user corresponds to a first portion of the avatar.

At block 1430, in accordance with determining that the future attentive state of the first user corresponds to the first portion of the avatar, the method 1400 presents the avatar of the second user, where the first portion of the avatar is presented with a higher quality than a second portion of the avatar.

The first device may obtain first quality versions of the first portion and the second portion and second quality version of the first portion and the second portion and selectively use the first quality versions and second quality versions to present the avatar based on the future attentive state of the first user.

In some implementations, the first device obtains avatar data comprising multiple versions of a first portion of a mesh representing the avatar and corresponding to the first portion of the avatar, multiple versions of a second portion of the mesh representing the avatar and corresponding to the second portion of the avatar, multiple versions of a first portion of a texture representing the avatar and corresponding to the first portion of the avatar, and multiple versions of a second portion of the texture representing the avatar and corresponding to the second portion of the avatar. The first device may select avatar data (e.g., using the avatar data selectively) to present the avatar based on the future attentive state of the first user. In this example, the multiple versions of the first portion of the mesh and the multiple versions of the second version of the mesh may be (but are not necessarily) obtained by the first device prior to the communication session. In this example, the multiple versions of the first portion of the texture and the multiple versions of the second version of the texture may be (but are not necessarily obtained by the first device during to the communication session.

In the method 1400, presenting the avatar may involve selecting an avatar data quality level for portions of the avatar based on which of the portions of the avatar are the focus of the future attentive state. Presenting the avatar may involve selecting parameters for portions of the avatar based on which of the portions of the avatar are the focus of the future attentive state. In some implementations, the parameters include mesh resolution parameters, animation resolution parameters, and shader complexity parameters.

Figure 15:
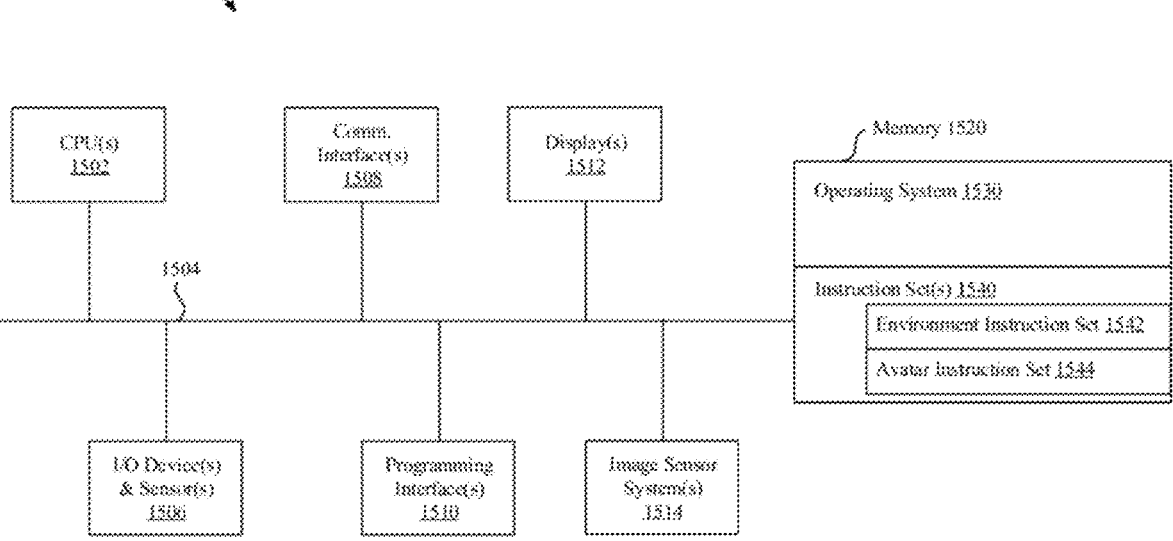
FIG. 15 is a block diagram of an electronic device of in accordance with some implementations.

FIG. 15 is a block diagram of electronic device 1500. Device 1500 illustrates an exemplary device configuration for electronic device 105 or electronic device 155. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 1500 includes one or more processing units 1502 (e.g., microprocessors, ASICs, FPGAs, GPUs, CPUs, processing cores, and/or the like), one or more input/output (I/O) devices and sensors 1506, one or more communication interfaces 1508 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, and/or the like type interface), one or more programming (e.g., I/O) interfaces 1510, one or more output device(s) 1512, one or more interior and/or exterior facing image sensor systems 1514, a memory 1520, and one or more communication buses 1504 for interconnecting these and various other components.

In some implementations, the one or more communication buses 1504 include circuitry that interconnects and controls communications between system components. In some implementations, the one or more I/O devices and sensors 1506 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more output device(s) 1512 include one or more displays configured to present a view of a 3D environment to the user. In some implementations, the one or more displays 1512 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), and/or the like display types. In some implementations, the one or more displays correspond to diffractive, reflective, polarized, holographic, etc. waveguide displays. In one example, the device 1500 includes a single display. In another example, the device 1500 includes a display for each eye of the user.

In some implementations, the one or more output device(s) 1512 include one or more audio producing devices. In some implementations, the one or more output device(s) 1512 include one or more speakers, surround sound speakers, speaker-arrays, or headphones that are used to produce spatialized sound, e.g., 3D audio effects. Such devices may virtually place sound sources in a 3D environment, including behind, above, or below one or more listeners. Generating spatialized sound may involve transforming sound waves (e.g., using head-related transfer function (HRTF), reverberation, or cancellation techniques) to mimic natural soundwaves (including reflections from walls and floors), which emanate from one or more points in a 3D environment. Spatialized sound may trick the listener's brain into interpreting sounds as if the sounds occurred at the point(s) in the 3D environment (e.g., from one or more particular sound sources) even though the actual sounds may be produced by speakers in other locations. The one or more output device(s) 1512 may additionally or alternatively be configured to generate haptics.

In some implementations, the one or more image sensor systems 1514 are configured to obtain image data that corresponds to at least a portion of a physical environment. For example, the one or more image sensor systems 1514 may include one or more RGB cameras (e.g., with a complimentary metal-oxide-semiconductor (CMOS) image sensor or a charge-coupled device (CCD) image sensor), monochrome cameras, IR cameras, depth cameras, event-based cameras, and/or the like. In various implementations, the one or more image sensor systems 1514 further include illumination sources that emit light, such as a flash. In various implementations, the one or more image sensor systems 1514 further include an on-camera image signal processor (ISP) configured to execute a plurality of processing operations on the image data.

The memory 1520 includes high-speed random-access memory, such as DRAM, SRAM, DDR RAM, or other random-access solid-state memory devices. In some implementations, the memory 1520 includes non-volatile memory, such as one or more magnetic disk storage devices, optical disk storage devices, flash memory devices, or other non-volatile solid-state storage devices. The memory 1520 optionally includes one or more storage devices remotely located from the one or more processing units 1502. The memory 1520 comprises a non-transitory computer readable storage medium.

In some implementations, the memory 1520 or the non-transitory computer readable storage medium of the memory 1520 stores an optional operating system 1530 and one or more instruction set(s) 1540. The operating system 1530 includes procedures for handling various basic system services and for performing hardware dependent tasks. In some implementations, the instruction set(s) 1540 include executable software defined by binary information stored in the form of electrical charge. In some implementations, the instruction set(s) 1540 are software that is executable by the one or more processing units 1502 to carry out one or more of the techniques described herein.

The instruction set(s) 1540 include an environment instruction set 1542 configured to, upon execution, provides views during a communication session of user avatars within an environment such as an XR environment as described herein. The instruction set(s) 1540 further include an avatar instruction set 1544 configured to, upon execution, manage an avatar provision process based on context (e.g., indicium of user attentive state), as described herein. The instruction set(s) 1540 may be embodied as a single software executable or multiple software executables.

Although the instruction set(s) 1540 are shown as residing on a single device, it should be understood that in other implementations, any combination of the elements may be located in separate computing devices. Moreover, FIG. 15 is intended more as functional description of the various features which are present in a particular implementation as opposed to a structural schematic of the implementations described herein. As recognized by those of ordinary skill in the art, items shown separately could be combined and some items could be separated. The actual number of instructions sets and how features are allocated among them may vary from one implementation to another and may depend in part on the particular combination of hardware, software, and/or firmware chosen for a particular implementation.

It will be appreciated that the implementations described above are cited by way of example, and that the present invention is not limited to what has been particularly shown and described hereinabove. Rather, the scope includes both combinations and sub combinations of the various features described hereinabove, as well as variations and modifications thereof which would occur to persons skilled in the art upon reading the foregoing description and which are not disclosed in the prior art.

As described above, one aspect of the present technology is the gathering and use of sensor data that may include user data to improve a user's experience of an electronic device. The present disclosure contemplates that in some instances, this gathered data may include personal information data that uniquely identifies a specific person or can be used to identify interests, traits, or tendencies of a specific person. Such personal information data can include movement data, physiological data, demographic data, location-based data, telephone numbers, email addresses, home addresses, device characteristics of personal devices, or any other personal information.

The present disclosure recognizes that the use of such personal information data, in the present technology, can be used to the benefit of users. For example, the personal information data can be used to improve the content viewing experience. Accordingly, use of such personal information data may enable calculated control of the electronic device. Further, other uses for personal information data that benefit the user are also contemplated by the present disclosure.

The present disclosure further contemplates that the entities responsible for the collection, analysis, disclosure, transfer, storage, or other use of such personal information and/or physiological data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates implementations in which users selectively block the use of, or access to, personal information data. That is, the present disclosure contemplates that hardware or software elements can be provided to prevent or block access to such personal information data. For example, in the case of user-tailored content delivery services, the present technology can be configured to allow users to select to "opt in" or "opt out" of participation in the collection of personal information data during registration for services. In another example, users can select not to provide personal information data for targeted content delivery services. In yet another example, users can select to not provide personal information, but permit the transfer of anonymous information for the purpose of improving the functioning of the device.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences or settings based on non-personal information data or a bare minimum amount of personal information, such as the content being requested by the device associated with a user, other non-personal information available to the content delivery services, or publicly available information.

In some embodiments, data is stored using a public/private key system that only allows the owner of the data to decrypt the stored data. In some other implementations, the data may be stored anonymously (e.g., without identifying and/or personal information about the user, such as a legal name, username, time and location data, or the like). In this way, other users, hackers, or third parties cannot determine the identity of the user associated with the stored data. In some implementations, a user may access their stored data from a user device that is different than the one used to upload the stored data. In these instances, the user may be required to provide login credentials to access their stored data.

Numerous specific details are set forth herein to provide a thorough understanding of the claimed subject matter. However, those skilled in the art will understand that the claimed subject matter may be practiced without these specific details. In other instances, methods apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "deter- mining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipur- pose microprocessor-based computer systems accessing stored software that programs or configures the computing system from a general-purpose computing apparatus to a specialized computing apparatus implementing one or more implementations of the present subject matter. Any suitable programming, scripting, or other type of language or com- binations of languages may be used to implement the teachings contained herein in software to be used in pro- gramming or configuring a computing device.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describ- ing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the pres- ence or addition of one or more other features, integers, steps, operations, elements, components, and/or groups thereof.

As used herein, the term "if" may be construed to mean "when" or "upon" or "in response to determining" or "in accordance with a determination" or "in response to detect- ing," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determi- nation" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:

at a first device having a processor:

obtaining, during a communication session between the first device in a first physical environment and a second device in a second physical environment, first avatar data representing an avatar of a second user of the second device;

presenting the avatar of the second user based on the first avatar data;

identifying an indicium indicative of whether a future attentive state of a first user of the first device is directed to the avatar of the second user; and in accordance with identifying the indicium:

obtaining second avatar data representing the avatar of the second user from a remote device, wherein a property of the first avatar data is different than a property of the second avatar data; and presenting the avatar of the second user based on the second avatar data.

2. The method of claim 1 further comprising predicting the future attentive state of the first user based on the indicium.

3. The method of claim 1, wherein presenting the avatar of the second user based on the first avatar data or presenting the avatar of the second user based on the second avatar data comprises presenting the avatar within a 3D environment.

4. The method of claim 1, wherein the property of the first avatar data represents a quality level of the first avatar data, and wherein the property of the second avatar data represents a quality level of the second avatar data.

5. The method of claim 1, wherein the property of the first avatar data represents a complexity level of a mesh or point cloud in the first avatar data, and wherein the property of the second avatar data represents a complexity level of a mesh or point cloud in the second avatar data.

6. The method of claim 1, wherein the property of the first avatar data represents a framerate of the first avatar data, and wherein the property of the second avatar data represents a framerate of the second avatar data.

7. The method of claim 1, wherein the property of the first avatar data represents an amount of the first avatar data used to represent an appearance and movement of the avatar during a time period, and wherein the property of the second avatar data represents an amount of the second avatar data used to represent an appearance and movement of the avatar during a time period.

8. The method of claim 1, wherein a difference between the property of the first avatar data and the property of the second avatar data represents a difference in an amount of a computing resource required to obtain, transmit, or render the first avatar data and the second avatar data.

9. The method of claim 1, wherein obtaining the first avatar data comprises obtaining the first avatar data from the second device or from an intermediary server different than the first device and second device.

10. The method of claim 1, wherein the first avatar data comprises, for each frame of multiple frames:

a texture representing a surface appearance of a portion of the second user, the texture determined based on image sensor data; and a skeleton representing 3D positioning of the portion of the second user, the skeleton determined based on motion sensor data.

11. The method of claim 10, wherein the indicium comprises:

whether a gaze direction of the first user is directed towards the avatar; or whether the gaze direction of the first user is directed towards an object other than the avatar.

12. The method of claim 1, wherein indicium comprises:

whether the avatar of the second user is within a first region of a field of view of the first user;

whether the avatar of the second user is outside the first region and within the field of view of the first user; or whether the avatar of the second user is outside the field of view of the first user.

13. The method of claim 1, wherein the second avatar data is obtained based on a determination that the future attentive state is different than a current attentive state of the first user relative to the avatar of the second user.

14. The method of claim 13, wherein:

the current attentive state corresponds to the avatar being within a first region of a field of view of the first user;

the future attentive state corresponds to the avatar being outside the first region and within the field of view of the first user; and the first avatar data has more data per time period than the second avatar data.

15. The method of claim 13, wherein:

the current attentive state corresponds to the avatar being within a first region of a field of view of the first user;

the future attentive state corresponds to the avatar being outside the field of view of the first user; and the first avatar data has more data per time period than the second avatar data.

16. The method of claim 13, wherein:

the current attentive state corresponds to the avatar being outside a first region and within a field of view of the first user;

the future attentive state corresponds to the avatar being outside the field of view of the first user; and the first avatar data has more data per time period than the second avatar data.

17. The method of claim 13, wherein:

the current attentive state corresponds to the avatar being positioned within a threshold distance of a current viewpoint of the first user in a 3D environment;

the future attentive state corresponds to the avatar being positioned beyond the threshold distance from the current viewpoint of the first user in the 3D environment; and the first avatar data has more data per time period than the second avatar data.

18. The method of claim 13, wherein:

the current attentive state corresponds to the avatar being outside a first region of a field of view of the first user and within the field of view of the first user;

the future attentive state corresponds to the avatar being within the first region of the field of view of the first user; and the first avatar data has less data per time period than the second avatar data.

19. The method of claim 13, wherein:

the current attentive state corresponds to the avatar being outside a field of view of the first user;

the future attentive state corresponds to the avatar being within a first region of the field of view of the first user; and the first avatar data has less data per time period than the second avatar data.

20. The method of claim 13, wherein:

the current attentive state corresponds to the avatar being outside the field of view of the first user;

the future attentive state corresponds to the avatar being outside the first region and within the field of view of the first user; and the first avatar data has less data per time period than the second avatar data.

21. The method of claim 13, wherein:

the current attentive state corresponds to the avatar being positioned beyond a threshold distance from a current viewpoint of the first user in a 3D environment;

the future attentive state corresponds to the avatar being positioned within a threshold distance of a current viewpoint of the first user in a 3D environment; and the first avatar data has less data per time period than the second avatar data.

22. The method of claim 1, wherein the indicium comprises:

a proximity of a position of the avatar of second user to a viewpoint of the first user in a 3D environment;

an activity of the first user in the first physical environment;

an activity of the second user; or an object or activity to which the first user is attentive.

23. The method of claim 1, wherein the indicium comprises a priority of two or more avatars participating in the communication session.

24. A system comprising:

a non-transitory computer-readable storage medium; and one or more processors coupled to the non-transitory computer-readable storage medium, wherein the non-transitory computer-readable storage medium comprises program instructions that, when executed on the one or more processors, cause the system to perform operations comprising:

obtaining, during a communication session between a first device in a first physical environment and a second device in a second physical environment, first avatar data representing an avatar of a second user of the second device;

presenting the avatar of the second user based on the first avatar data;

identifying an indicium indicative of whether a future attentive state of a first user of the first device is directed to the avatar of the second user;

in accordance with identifying the indicium:

obtaining second avatar data representing the avatar of the second user from a remote device, wherein a property of the first avatar data is different than a property of the second avatar data; and presenting the avatar of the second user based on the second avatar data.

25. A non-transitory computer-readable storage medium storing program instructions executable via one or more processors to perform operations comprising:

obtaining, during a communication session between a first device in a first physical environment and a second device in a second physical environment, first avatar data representing an avatar of a second user of the second device;

presenting the avatar of the second user based on the first avatar data;

identifying an indicium indicative of whether a future attentive state of a first user of the first device is directed to the avatar of the second user;

in accordance with identifying the indicium:

obtaining second avatar data representing the avatar of the second user from a remote device, wherein a property of the first avatar data is different than a property of the second avatar data; and presenting the avatar of the second user based on the second avatar data.

* * * * *